(12) United States Patent
Yamane et al.

(10) Patent No.: US 8,905,105 B2
(45) Date of Patent: Dec. 9, 2014

(54) WINDING MACHINE AND WINDING METHOD

(75) Inventors: Toshio Yamane, Shiga (JP); Jun Tsuda, Shiga (JP)

(73) Assignee: Sekisui Chemical Co., Ltd., Osaka (JP)

( * ) Notice: Subject to any disclaimer, the term of this patent is extended or adjusted under 35 U.S.C. 154(b) by 352 days.

(21) Appl. No.: 13/386,871

(22) PCT Filed: Jul. 27, 2010

(86) PCT No.: PCT/JP2010/062565
§ 371 (c)(1),
(2), (4) Date: Jan. 24, 2012

(87) PCT Pub. No.: WO2011/013636
PCT Pub. Date: Feb. 3, 2011

(65) Prior Publication Data
US 2012/0118482 A1    May 17, 2012

(30) Foreign Application Priority Data
Jul. 27, 2009 (JP) .................................. 2009-174641

(51) Int. Cl.
*F16L 55/18* (2006.01)
*F16L 55/165* (2006.01)
*B29C 63/32* (2006.01)
*B29C 53/78* (2006.01)

(52) U.S. Cl.
CPC ............ *F16L 55/1655* (2013.01); *B29C 63/32* (2013.01); *F16L 55/18* (2013.01); *B29C 53/78* (2013.01)
USPC ....................................... 156/425

(58) Field of Classification Search
CPC .................................................. F16L 55/1655
USPC ................ 156/425, 184, 293, 294; 405/154.1
See application file for complete search history.

(56) References Cited

U.S. PATENT DOCUMENTS

| | | | |
|---|---|---|---|
| 5,799,701 A * | 9/1998 | Kitahashi et al. ................ | 138/97 |
| 7,186,060 B2 * | 3/2007 | Akimoto et al. ............ | 405/184.2 |
| 8,347,477 B2 * | 1/2013 | Kakine et al. .............. | 405/184.2 |
| 2004/0013472 A1 | 1/2004 | Akimoto et al. | |
| 2010/0008731 A1 | 1/2010 | Kakine et al. | |

FOREIGN PATENT DOCUMENTS

| | | |
|---|---|---|
| JP | 3072015 B2 | 8/1996 |
| JP | 9-57850 A | 3/1997 |
| JP | 10-227389 A | 8/1998 |
| JP | 2002-213649 A | 7/2002 |
| JP | 2003-175547 A | 6/2003 |
| WO | WO-2008/075681 A1 | 6/2008 |

OTHER PUBLICATIONS

International Search Report for the Application No. PCT/JP2010/062565 mailed Oct. 12, 2010.

* cited by examiner

*Primary Examiner* — Jeff Aftergut
(74) *Attorney, Agent, or Firm* — Cheng Law Group, PLLC

(57) ABSTRACT

A winding machine (1) according to one embodiment includes a frame (2) that is installed inside an existing pipe (200), a joining mechanism (4) for joining a plastic strip (100), and a wheel (6) for supporting the joining mechanism (4) on an inner surface of the existing pipe (200). The joining mechanism (4) includes an inner roller (42) and an outer roller (43) that sandwich the plastic strip (100) from inside and outside. The wheel (6) includes a rotational shaft at a position different from positions of rotational shafts of the inner roller (42) and the outer roller (43). The outer roller (43) of the joining mechanism (4) is maintained in a state of being separated from the inner surface of the existing pipe (200).

10 Claims, 20 Drawing Sheets

(a)

(b)

(a)

(b)

FIG.21
PriorArt
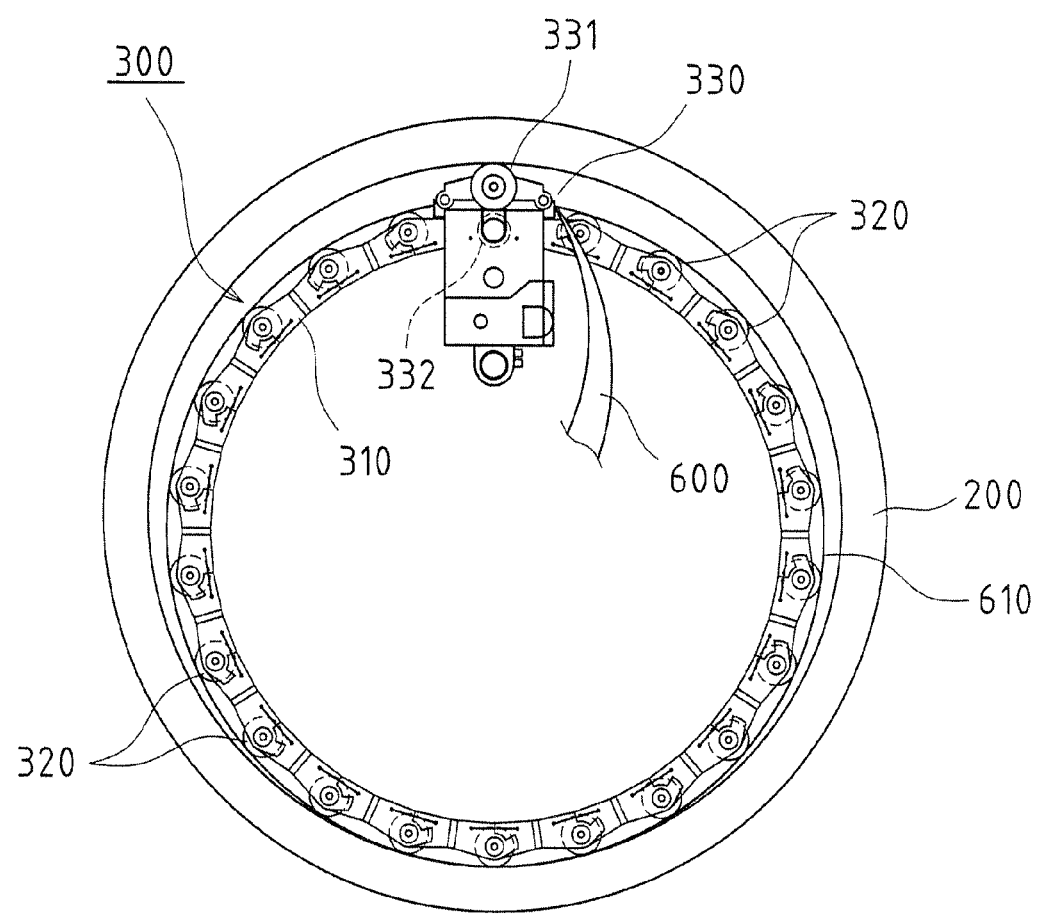

WINDING MACHINE AND WINDING METHOD

TECHNICAL FIELD

The present invention relates to a winding machine for rehabilitating the inner surface of a pipe by helically winding a plastic strip in various existing pipes such as an agricultural water pipe, a sewage pipe, a water supply pipe, and a gas pipe, and a winding method using the winding machine.

BACKGROUND ART

As a countermeasure for dealing with cases in which the inner surface of existing pipes, such as an agricultural water pipe, a sewage pipe, and a water supply pipe undergo cracking or corrosion on the inner surface, or has deteriorated, a method is available in which existing pipes are rehabilitated by lining the inner surface with a plastic material.

In a method of this type, a plastic strip including joint portions at its opposite side edge portions is used, and the plastic strip is helically wound in an existing pipe to form a rehabilitating pipe for lining. For example, Patent Document 1 describes a method in which a drum around which a plastic strip is wound is installed on the ground, a winding machine is disposed in an existing pipe, the plastic strip is continuously supplied from the drum to the winding machine and is helically wound, and the joint portions of windings of the plastic strip that are arranged adjacent to each other by being wound are joined with each other, and thereby the plastic strip is formed into a tubular shape. The rehabilitating pipe thus formed is left as is in the existing pipe, and the plastic strip is newly fed, wound, and joined, and thereby a rehabilitating pipe is formed additionally and successively.

As shown in FIG. 21, a conventional winding machine 300 includes an annular frame 310 on which a plurality of rollers 320 are journaled, and a joining mechanism 330 for joining joint portions at opposite side edge portions of a plastic strip 600. The joining mechanism 330 includes an outer roller 331 and an inner roller 332, between which the plastic strip 600 is sandwiched to join the joint portions, and thereby the plastic strip is formed into a tubular shape. The winding machine 300 orbits along the inner surface of the existing pipe 200 by reaction that causes the plastic strip 600 to be sent out from the joining mechanism 330.

Meanwhile, sediment may exist or cracks or pits and projections have been formed on the inner surface of the existing pipe 200 due to a long-term use, and therefore there is the possibility that the outer roller 331 may get stuck by such pits and projections or the like. If the outer roller 331 gets stuck by the pits and projections on the inner surface on the existing pipe 200, it can no longer be smoothly rotated, which also makes the orbiting of the joining mechanism 330 difficult.

PRIOR ART DOCUMENT

Patent Document

[Patent Document 1] JP 3072015B

SUMMARY OF INVENTION

Problems to be Solved by the Invention

During the operation of rehabilitating existing pipes, the fluid in the pipe channel may occasionally be dammed or bypassed, which affects the traffic on the ground. Therefore, it is desired that the operation is completed in the shortest possible time and that the operation is carried out accurately and safely. However, with the above-described conventional winding machine, if the outer roller has come into contact with the pits and projections or the like on the inner surface of the existing pipe, the winding operation has to be interrupted, and repair or replace the outer roller has to be performed so that the outer roller can be rotated smoothly, resulting in a prolonged operation period.

Further, at the time of winding the plastic strip to form a rehabilitating pipe, resistance force tends to be generated between a portion of the plastic strip that has already formed into a tubular shape (rehabilitating pipe) and the winding machine, and therefore there is the possibility that the winding machine cannot be readily operated. In such a case, the generated resistance force acts to prevent rotation of the inner roller and the outer roller, resulting in loosening of the plastic strip that is supplied to the winding machine. When the plastic strip has become loose, the plastic strip is wound in a diameter larger than that of the rehabilitating pipe that has been already formed, which may cause a phenomenon in which the increasing diameters of the rehabilitating pipe (winding growth) gradually increases as the winding operation proceeds.

In order to deal with such conventional problems, it is an object of the present invention to provide a winding machine that can minimize the time and effort required for a winding operation using a plastic strip and efficiently form a high-precision rehabilitating pipe in a short time, thus enabling a highly safe winding operation, and a winding method for a rehabilitating pipe using the winding machine.

Means for Solving the Problems

In the present invention, a frame installed inside an existing pipe, a joining mechanism for joining a plastic strip, and a support for supporting the joining mechanism on an inner surface of the existing pipe are provided. The plastic strip is an elongated material that includes joint portions at opposite side edge portions in a width direction and that is formed into a tubular shape by the joint portions arranged adjacent to each other by being helically wound and joined by the joining mechanism. The frame includes a plurality of rotatable rollers, and is capable of orbiting along the inner surface of the existing pipe. The joining mechanism that is provided in the frame and that includes an inner roller and an outer roller that sandwich the plastic strip from inside and outside. The support is rotatable in contact with the inner surface of the existing pipe, and includes a rotational shaft thereof at a position different from positions of rotational shafts of the inner roller and the outer roller. Also, the frame and the joining mechanism orbit along the inner surface of the existing pipe, and the support is rotated in contact with the inner surface of the existing pipe, whereby the outer roller can be maintained separated from the inner surface of the existing pipe.

Due to this specific matter, it is possible to prevent the outer roller of the joining mechanism from getting stuck by sediment, or cracks or projections and depressions or the like on the inner surface of an existing pipe. Accordingly, the outer roller and the inner roller can be rotated smoothly, making it possible to efficiently form a plastic strip into a tubular structure without interrupting the operation of the joining mechanism. Since the joining mechanism is operated smoothly, the plastic strip will not become loose and the phenomenon in which the winding growth of the rehabilitating pipe gradually increases can be avoided. Moreover, there is no need for a repair or replacement operation for the outer roller, and therefore the winding operation can be completed in a short time.

Examples of specific configurations of the above-described winding machine include the following.

First, it is preferable that the frame is made up of a plurality of links and can be made to have any outer shape. It is also preferable that this frame includes coupling frames are provided that couple the joining mechanism to the links while maintaining a constant angle.

In this case, the coupling frame supports, together with the support, the joining mechanism on the inner surface of the existing pipe. Thereby, in the deformable frame, the joining mechanism is supported by the coupling frame such that the distance between the outer roller and the inner surface of the existing pipe is maintained, thus enabling the outer roller to be rotated even more smoothly.

It is preferable that the support is provided both at front and rear sides in a rotation direction of the outer roller. Thereby, the support supports the joining mechanism both at front and rear sides in the rotation direction of the outer roller, thus enabling the joining mechanism to orbit more stably.

The joining mechanism may include a drive unit and a fit unit. That is, the drive unit and the fit unit each independently include an inner roller and an outer roller, the drive unit causes the joining mechanism to orbit along the inner surface of the existing pipe, and the fit unit joins the joint portions of the plastic strip with each other.

This allows the joining of the plastic strip in the joining mechanism and the orbital driving of the winding machine to be operated by separate mechanisms. Consequently, it is possible to feed and join the plastic strip at a constant speed, thus ensuring the dimensional stability of the rehabilitating pipe. Accordingly, the winding speed of the winding machine is increased, and therefore it is possible to efficiently form a high-precision rehabilitating pipe in a short time.

More specifically, the drive unit includes a first portion where the inner roller and the outer roller sandwich a newly supplied plastic strip whose joint portions have not been joined, and a second portion where the inner roller and the outer roller sandwich the plastic strip whose joint portions have been joined, and the joining mechanism is orbited by reactive force by which the second portion sandwiches and sends out the plastic strip.

That is, the configuration of the drive unit allows the first turn of the newly supplied plastic strip to pass through the drive unit in a state of not being sandwiched by the drive unit and to be guided to the fit unit in a stable track. Further, the drive unit sandwiches the wound plastic strip from inside and outside, and send them out while maintaining a constant speed. Thereby, a plastic strip that is to be newly joined will not be wobbled. Further, the joint portion of the second turn of the wound plastic strip can be precisely guided to an appropriate position at which the first turn of the newly supplied plastic strip can be joined and joining can be performed while maintaining a constant speed, and therefore it is possible to form a rehabilitating pipe without causing the phenomenon of increasing winding growth (increasing diameters of the winding).

Preferably, the inner roller of the fit unit is rotatably provided on a rotational shaft. Thereby, the inner roller of the fit unit is rotated by coming into contact with the plastic strip, and serves to smoothly join the joint portions of the plastic strip with each other without generating resistance force between the plastic strip and itself.

Preferably, the frame includes, inside the frame, a guide that defines a path for supplying the plastic strip to the joining mechanism.

Specifically, the guide includes a plurality of rollers that are provided in pairs so as to make abutment with the inside and the outside of the plastic strip and be rotated. Preferably, the guide includes a curved guide plate, and a plurality of rollers that are rotated in abutment with the plastic strip and hold the plastic strip between the guide plate and themselves.

This enables a plastic strip that is newly supplied to the joining mechanism to be sent in an appropriate orientation and position, thus preventing undue force from acting on the plastic strip. Accordingly, it is possible to smoothly feed the plastic strip at a constant speed, thus stabilizing the joined state of the plastic strip and smoothly forming a rehabilitating pipe without causing any winding failure.

A winding method for forming a rehabilitating pipe from a plastic strip by using a winding machine having the above-described configuration also falls within the technical idea of the present invention. That is, the winding method includes: installing the winding machine in an existing pipe, driving the winding machine in a state in which the joining mechanism is supported on an inner surface of the existing pipe by the support, supplying a plastic strip to the joining mechanism, and joining the joint portions of the plastic strip in a state in which the outer roller is separated from the inner surface of the existing pipe, thus forming a rehabilitating pipe.

This can prevent the phenomenon in which the winding growth gradually increases during winding, thus making it possible to wind a rehabilitating pipe accurately. Furthermore, the problem that the outer roller get stuck by sediment, cracks or projections and depressions or the like in the existing pipe is mitigated, and therefore supplementary operations, repair or replacement operation, or the like during the winding operation can be reduced, and therefore it is possible to efficiently and safely perform winding in a short time.

Effects of the Invention

With the winding machine and the winding method according to the present invention that are configured as described above, the outer roller of the joining mechanism is maintained in a state of being separated from the inner surface of the existing pipe, and therefore the outer roller and the inner roller can be rotated smoothly, thus eliminating various problems resulting from contact with the inner surface of the existing pipe. Accordingly, the time and effort for the operation can be saved, making it possible to efficiently and smoothly perform winding in a short time. Furthermore, unnecessary force does not act on the plastic strip during winding and the plastic strip can be smoothly feed and joined, and therefore it is possible to form a rehabilitating pipe accurately.

BRIEF DESCRIPTION OF DRAWINGS

FIG. 21 is a front view showing an example of a conventional winding machine.

DESCRIPTION OF EMBODIMENTS

Hereinafter, a winding machine and a winding method according to embodiments of the present invention will be described with reference to the drawings.

Figure 1:
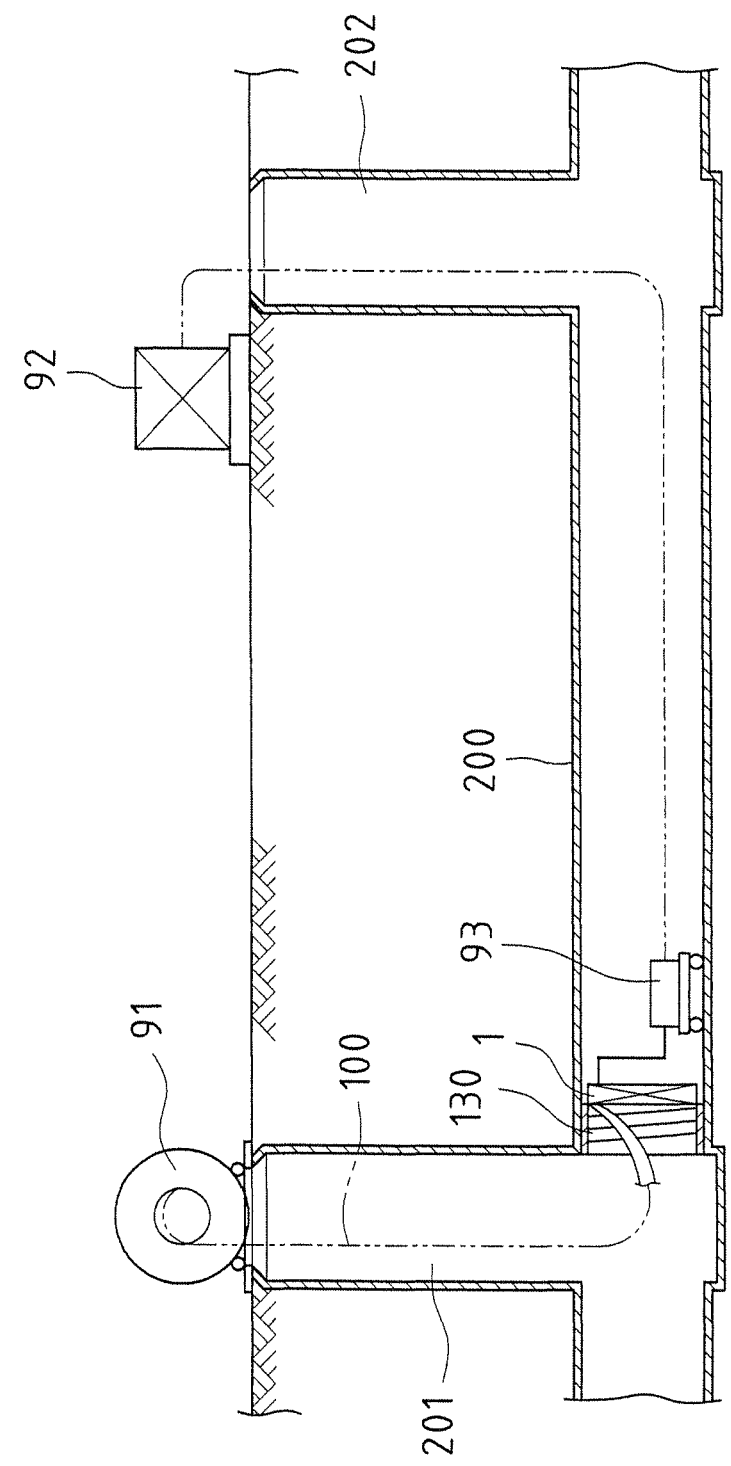
FIG. 1 is an explanatory diagram showing an example of a winding method using a winding machine according to an embodiment of the present invention.

FIG. 1 is an explanatory diagram schematically showing an example of a winding method using a winding machine according to an embodiment. In the following description, for the sake of convenience, a direction in which the winding machine travels in a pipe channel when winding a rehabilitating pipe with the winding machine is a forward direction, and the opposite direction is a backward direction.

In one embodiment, an elongated plastic strip 100 including joint portions at opposite side edge portions is supplied to a winding machine 1 of an existing pipe 200 and is helically wound with the winding machine 1, and the joint portions of the windings of the plastic strip 100 that are arranged adjacent to each other by being wound are joined with each other to form a rehabilitating pipe 130, thus rehabilitating the inner surface of the existing pipe 200. The winding machine 1 performs winding by moving in the direction of the axial center of the existing pipe 200 while being rotated circumferentially on the inner surface of the existing pipe 200.

Here, a description will be given of the plastic strip 100, before the description of the winding machine 1 and a winding method.

Plastic Strip

Figure 2:
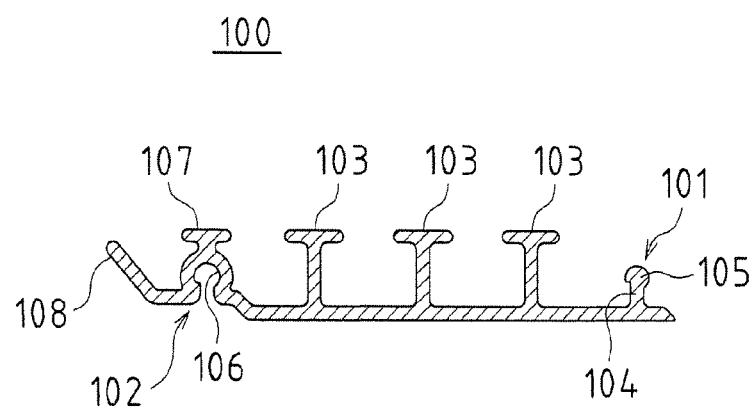
FIG. 2 is a cross-sectional view showing an example of a plastic strip forming a rehabilitating pipe in this embodiment.
Figure 3:
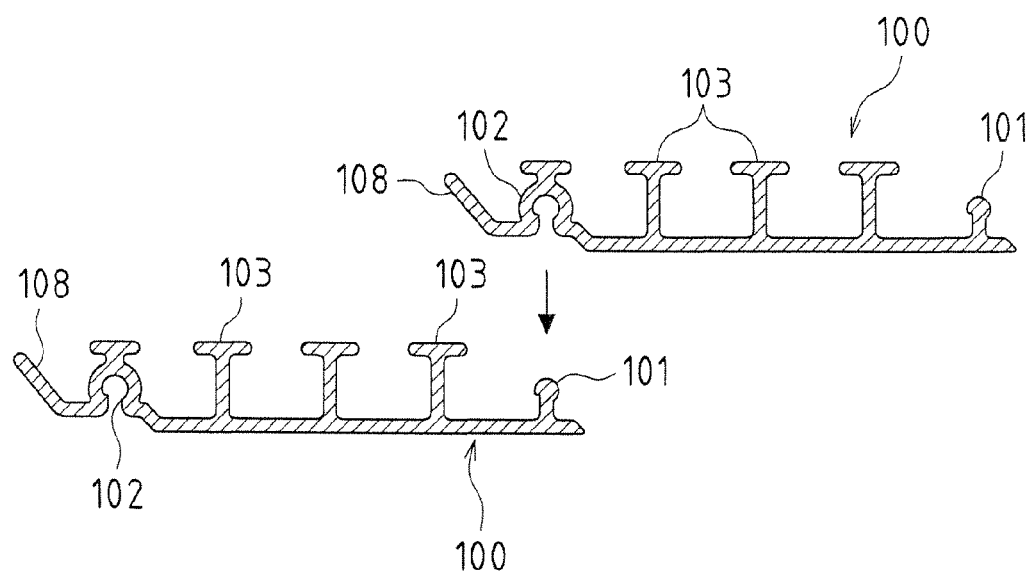
FIG. 3 is an explanatory diagram showing how joint portions of the plastic strip shown in FIG. 2 are joined with each other.
Figure 4:
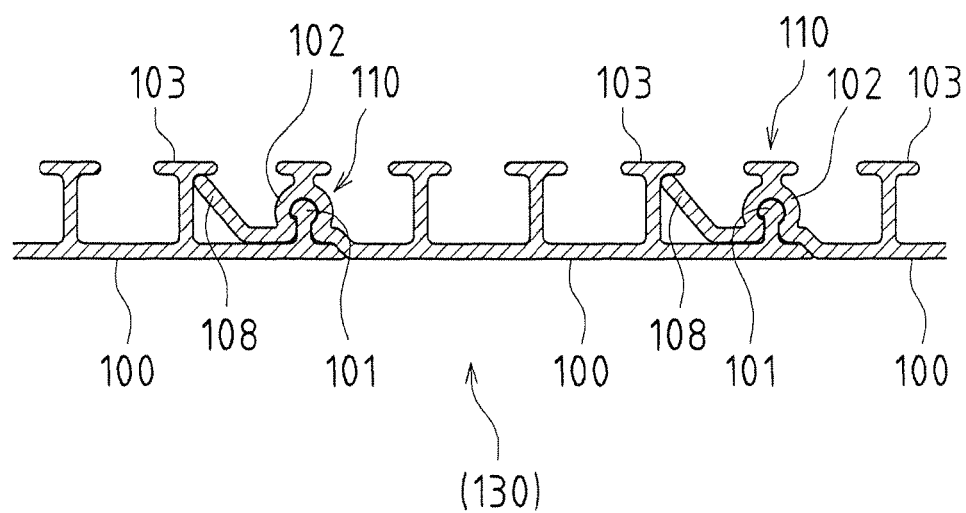
FIG. 4 is an explanatory diagram showing a state in which windings of the above-described plastic strip have been joined with each other.

FIG. 2 is a cross-sectional view showing an example of the plastic strip, FIG. 3 is an explanatory diagram showing how joint portions of the plastic strip shown in FIG. 2 are joined with each other, and FIG. 4 is an explanatory diagram showing a state in which windings of the plastic strip have been joined with each other.

The plastic strip 100 shown in FIG. 2 is made of a plastic-based material such as a rigid vinyl chloride, polyethylene, or polypropylene, and is formed as an elongated strip having flexibility. A joint convex portion 101 and a joint concave portion 102 (joint portions) that are joined by being fitted with an adjacent winding of the plastic strip 100 are formed at the opposite side edge portions of the plastic strip 100 along the longitudinal direction.

The joint convex portion 101 includes a column portion 104 and a fitting portion 105 that is provided at a tip thereof and has substantially a circular cross section. The joint concave portion 102 is formed at a side edge portion on the side opposite to the joint convex portion 101, and includes a fitted portion 106 having substantially a circular cross section and a flange portion 107 that is formed outside (above in FIG. 2) of the fitted portion 106. A strip-shaped soft elastic material such as an elastomer that prevents adjacent windings of the plastic strip 100 from slipping when they are joined with each other and attaches them tightly together, may be provided in the vicinity of the joint convex portion 101.

A plurality of ribs 103 . . . 103 are provided standing upright along the longitudinal direction between the joint convex portion 101 and the joint concave portion 102 of the plastic strip 100. The ribs 103 . . . 103 each have substantially a T-shaped tip portion that forms a flange that is similar to the flange portion 107 of the joint concave portion 102.

The plastic strip 100 also has an inclined piece 108 that is bent and extended in a slanting direction at an outer edge of the joint concave portion 102. When the joint concave portion 102 is fitted with the joint convex portion 101 of the adjacent winding of the profile strip 100, a tip portion of the inclined piece 108 is fitted with the substantially T-shaped tip portion of the rib 103 formed at a side portion of the joint convex portion 101.

Such a plastic strip 100 is helically wound by a winding machine 1 described below. In such a winding process, into the joint concave portion 102 of one of two windings of the plastic strip 100 that are adjacent to each other, the joint convex portion 101 of the other winding of the plastic strip 100 is fitted from inside (the inside of the already wound winding of the plastic strip 100) as shown in FIG. 3. Also, the inclined piece 108 of the plastic strip 100 is pressed and fitted into the tip portion of the rib 103 of the adjacent winding of the plastic strip 100. Thereby, as shown in FIG. 4, the windings of the plastic strip 100 that are disposed adjacent to each other are joined with each other.

In the examples shown in FIGS. 8, 18, and 19 described below, a reinforcing material 109 is attached to the plastic strip 100. The reinforcing material 109 is formed by bending a strip-shaped steel plate so as to have a substantially W-shape cross section, and is attached between adjacent ribs 103 of the plastic strip 100 to increase the strength of a rehabilitating pipe 130 to be formed.

The joining strength of the plastic strip 100 is increased by fitting between the joint convex portion 101 and the joint concave portion 102 and locking between the inclined piece 108 and the rib 103, and its water leakage prevention performance as the rehabilitating pipe 130 can also be increased. As shown in FIG. 1, the plastic strip 100 is provided at a treatment site in a state in which it is rolled around a drum 91, and is unreeled from the drum 91 to the existing pipe 200.

Figure 20:
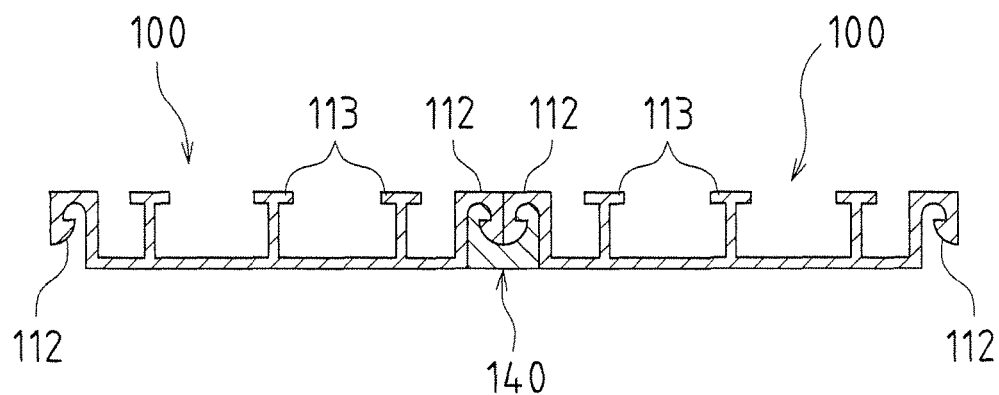
FIG. 20(a) is a cross-sectional view showing another example of the plastic strip.
FIG. 20(b) is a partial perspective view of a joint portion.
Figure 20:
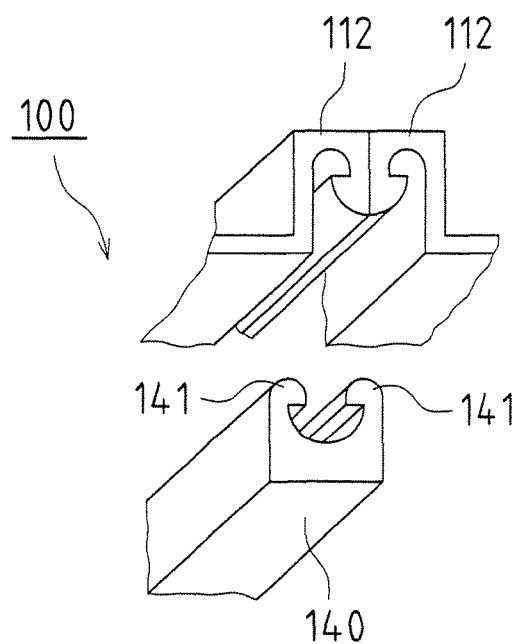

The plastic strip forming the rehabilitating pipe 130 may be a plastic strip 100 that is joined via a connector 140 as shown in FIGS. 20(*a*) and 20(*b*). FIG. 20(*a*) is a cross-sectional view showing the plastic strip 100, and FIG. 20(*b*) is a perspective view of the joint portions of the plastic strip 100 and the connector 140.

The plastic strip 100 includes a connector 140 for connecting side edge portions of adjacent windings of the strip. The plastic strip 100 is an elongated body including a plurality of ribs 113 on a substrate. A joint portion 112 having a concave shape is continuously formed at opposite side edge portions of the plastic strip 100 in the longitudinal direction. When the side edge portions of windings of the plastic strip 100 are arranged adjacent to each other by being wound, two joint portions 112 are abutted against each other to form a convex shape.

The connector 140 includes a pair of joint convex portions 141. The pair of joint convex portions 141 are continuously formed along the longitudinal direction, and are formed in a shape corresponding to the shape of the joint portions 112 when windings of the plastic strip 100 are abutted against each other.

Windings of the plastic strip 100 are arranged adjacent to each other in the winding process, and are joined with each other by the connector 140 fitted over the joint portions 112 at their side edge portions.

(Embodiment 1)

Next, a winding machine and a winding method according to an embodiment will be described.

In the present invention, the winding machine 1 includes a frame 2 for shaping the plastic strip 100 by winding the plastic strip 100 on its outer circumferential surface, a plurality of rollers 3 that are rotatably provided on the frame 2, and a joining mechanism 4 that is attached to the frame 2 and joins adjacent windings of the plastic strip 100 with each other.

Winding Machine

First, the winding machine according to Embodiment 1 will be described with reference to the drawings.

Figure 5:
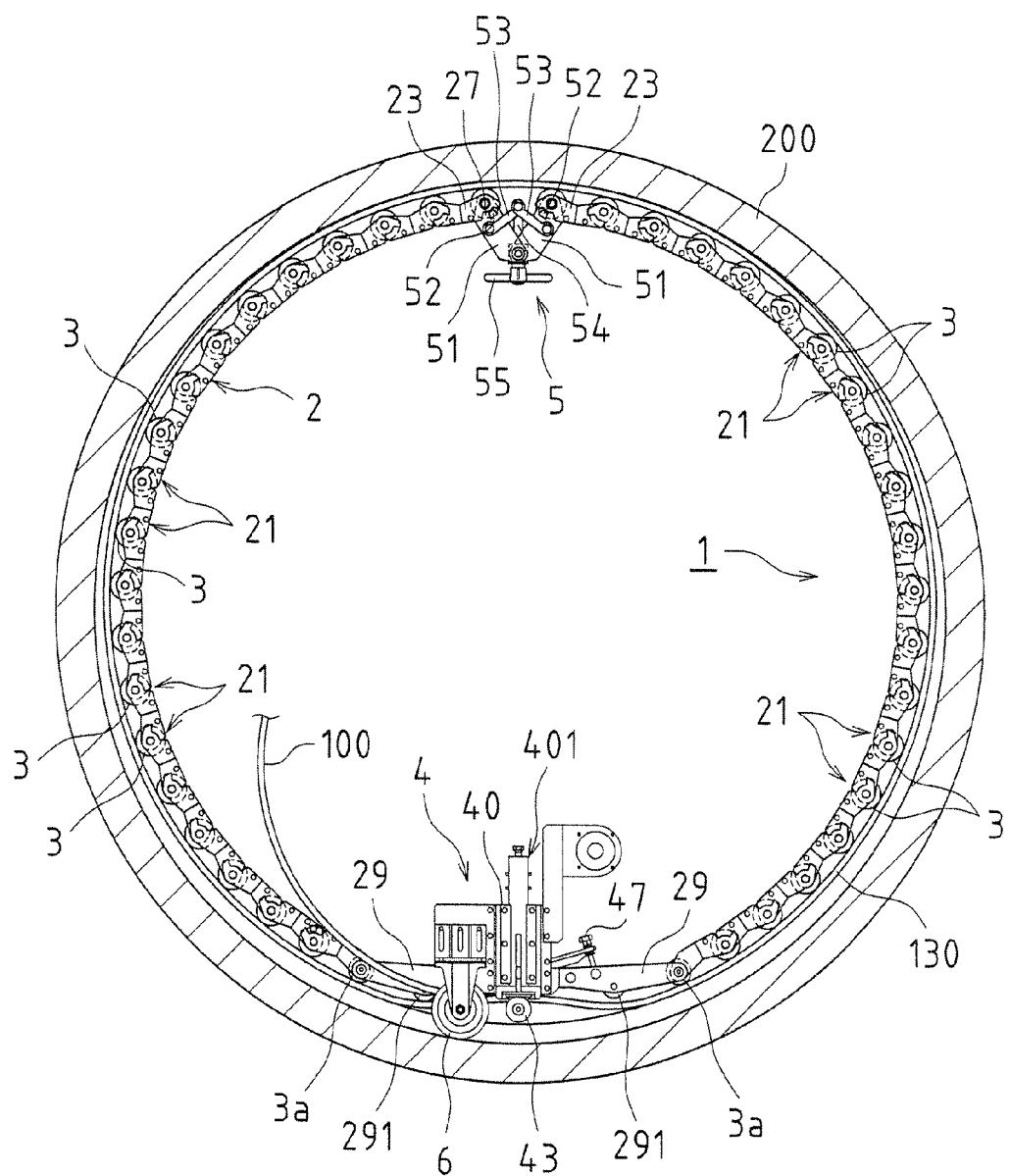
FIG. 5 is a front view showing a winding machine according to Embodiment 1.
Figure 6:
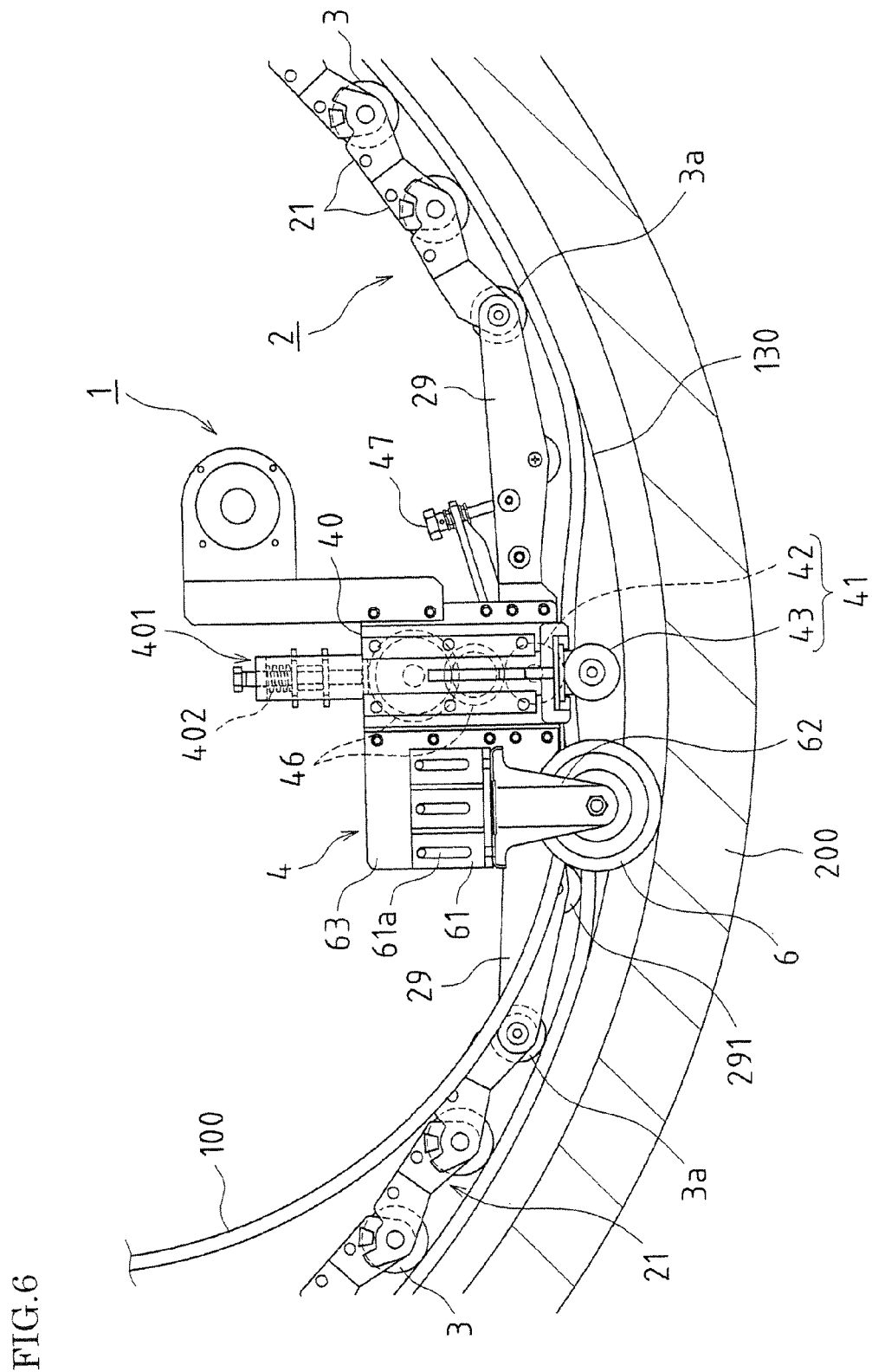
FIG. 6 is an explanatory diagram showing, in enlargement, a joining mechanism of the above-described winding machine.
Figure 7:
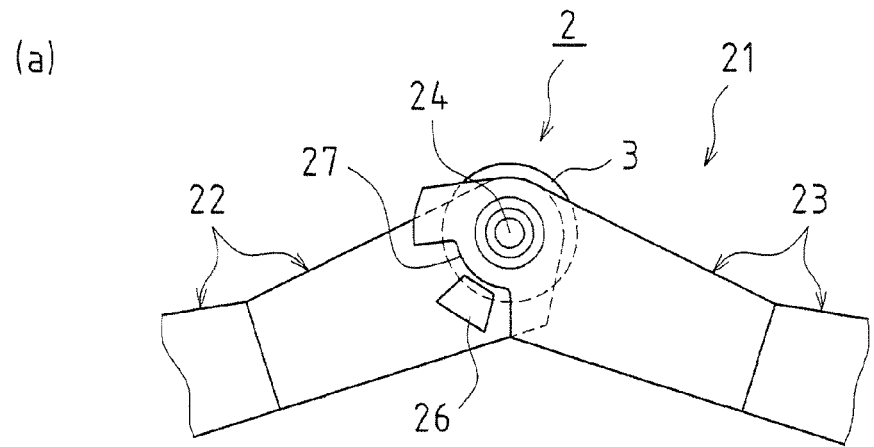
FIG. 7 show a link constituting the frame of the above-described winding machine, with FIG. 7(a) being a front view and FIG. 7(b) being a plan view.
Figure 7:
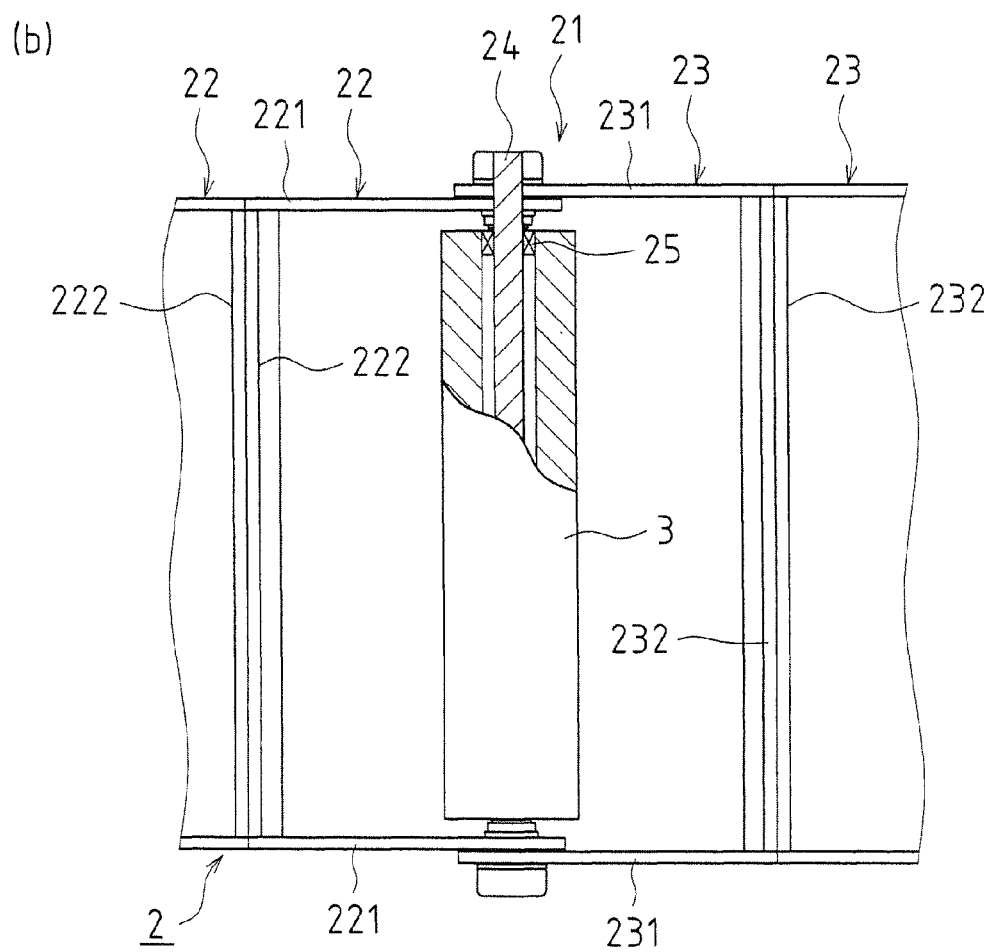

FIG. 5 is a front view showing an example of the winding machine, and FIG. 6 is an explanatory diagram showing, in enlargement, the joining mechanism of the winding machine shown in FIG. 5. FIG. 6 shows a state in which the joining mechanism is located at a lower portion of the existing pipe 200 (the bottom portion of the pipe). FIG. 7 show a link constituting the frame of the winding machine, with FIG. 7(*a*) being a front view and FIG. 7(*b*) being a plan view. FIG. 8 is a side view showing a pinch roller of the joining mechanism, and FIG. 9 is a plan view of a principal part of the joining mechanism and a wheel.

As shown in FIG. 5, the frame 2 of the winding machine 1 is formed in an annular shape corresponding to the shape of the inner surface of the existing pipe 200. The frame 2 having the illustrated configuration includes a plurality of links 21 that are rotatably coupled.

As shown in FIG. 7(*a*) in enlargement, the frame 2 is formed such that a set of link frames 22, 23 are rotatably coupled via a shaft portion 24 to form a single link 21, and a plurality of links 21 are coupled to each other to form a substantially annular shape.

As shown in FIG. 7(*b*), the frame 2 is formed to have a depth in the direction of the axial direction of the pipe. The link frames 22, 23 constituting each link 21 include pairs of opposing linking plates 221, 231 and coupling plates 222, 232 that are provided across first end portions of the pairs of opposing linking plates 221, 231. Then, each link 21 is formed by superimposing second end portions of the pair of linking plates 231 in the link frame 23 over second end portions of the pair of linking plates 221 in the link frame 22, and rotatably coupling them via the shaft portion 24.

Adjacent links 21 are detachably coupled to each other via, for example, a volt and a nut by causing the coupling plates 222 or the coupling plates 232 of the link frame 22, 23 to abut against each other. That is, the frame 2 can be disassembled by releasing the coupling between the links 21, and can also be assembled in the existing pipe 200 by coupling the same.

Such links 21 form the frame 2 in a straight line, and therefore, if specific adjacent links 21 can be detached, the coupling plates 222, 232 of the remaining links 21 may be undetachably coupled by welding or the like.

A rotation regulating piece 26 is provided at each of the second end portions of the pair of linking plates 221 of the link frame 22. Also, a notch portion 27 corresponding to the rotation regulating piece 26 is provided at each of the second end portions of the pair of linking plates 231 of the link frame 23. The notch portion 27 is formed, extending across a fixed range on a set radius about the rotation center of the shaft portion 24. Thereby, the mutual rotational operation of the link frames 22, 23 is regulated within an angle range until the rotation regulating piece 26 and the notch portion 27 come into contact with each other, thus preventing the link 21 from being bent inward or outward.

A roller 3 is attached to each shaft portion 24 of the frame 2 via a bearing 25. Thereby, the plurality of rollers 3 are rotatably supported on the links 21 of the frame 2. Each roller 3 is made of, for example, a rigid plastic body or a metal body. The plurality of rollers 3 provided in the frame 2 come into contact with the inner surface of the plastic strip 100 to be wound.

As shown in FIG. 5, the frame 2 is provided with a chain link 5. As shown in the drawing, the chain link 5 includes linking elements 51 whose first end portions are rotatably coupled to the link frames 23 of the links 21. A rotation regulating piece 52 corresponding to the notch portion 27 of the linking plate 231 is provided at the first end portions of the links 51, so that the range in which the chain link 5 can be rotated with respect to the link 21 is regulated. Also, in the chain link 5, second end portions of the linking elements 51 are rotatably coupled to each other in a bent state.

The chain link 5 also includes link arms 53. Proximal ends of the link arms 53 are rotatably coupled to each other, and second end portions thereof are rotatably coupled to the respective linking elements 51. A screw shaft 54 is threadedly coupled to the proximal ends of the link arms 53, 53 via a shaft coupling the linking elements 51. The screw shaft 54 includes a handle 55 inside the frame 2. Thereby, rotating the handle 55 increases or decreases the angle formed between the link arms 53 via the screw shaft 54 to increase or decrease the angle formed between the linking elements 51, thus increasing or decreasing the diameter of the frame 2.

Any means capable of changing the bent shape of the chain link 5, or in the words, opening or closing the chain link 5 is used for the chain link 5 without being limited to the one described above, and it is possible to use, for example, a hydraulic cylinder and an air cylinder that is expanded and contracted by air pressure, in addition to a means that performs the opening/closing adjustment for the chain link 5 by a mechanical action as described above.

The joining mechanism 4 is provided on the frame 2 via coupling frames 29 whose first end portions are rotatably coupled to the links 21. The coupling frames 29 are frame bodies having stiffness and a length longer than that of the link frames 23.

As shown in FIG. 5, the coupling frames 29 are arranged in a straight line that forms a chord with respect to the inner arc shape of the existing pipe 200 via rollers 3a. That is, the coupling frames 29 are provided extending in the left and right-hand direction in the drawing, with their first end portions coupled to the links 21 and second end portions joined and fixed to opposite side portions of the joining mechanism 4 at substantially at right angles. The coupling angle between the joining mechanism 4 and each coupling frame 29 can be adjusted by using an annexed angle adjustment element 47 according to the pipe diameter of the existing pipe 200. Also, a feed roller 291 that makes the rotation relative to the rehabilitating pipe 130 smooth by being rotated in contact with the inner surface of the rehabilitating pipe 130 for rotation may be provided in an intermediate portion of each of the coupling frames 29.

The joining mechanism 4 is integrated with the frame 2, and is supported in a state in which it is separated from the inner circumferential surface of the existing pipe 200 by a fixed distance. The coupling frames 29 form an integral support structure for the joining mechanism 4.

The joining mechanism 4 includes a gearbox 40. Provided inside the gearbox 40 are a pinch roller 41 including an inner roller 42 and an outer roller 43 that are paired and gear mechanisms 46 for periodically rotating the pinch roller 41. Also, a hydraulic motor 45 is attached to a side portion of the gearbox 40.

The pinch roller 41 includes the inner roller 42 and the outer roller 43 in a pair, and sandwiches the plastic strip 100 from inside and outside. As shown in FIG. 8, the joining mechanism 4 includes a hydraulic motor 45, and rotates the pinch roller 41 via the gear mechanisms 46 contained in the gearbox 40 fixed to the link frames 23 of the links 21 in the frame 2. As shown in FIG. 1, the hydraulic motor 45 is driven with pressure oil supplied from a hydraulic unit 93 through a pressure oil hose, and the hydraulic unit 93 is driven with electric power supplied from a power generator 92.

The inner roller 42 and the outer roller 43 are provided in the gearbox 40 via the gear mechanisms 46, and are journaled in a direction parallel to the pipe axis of the existing pipe 200. The rotational shaft of the inner roller 42 and the rotational shaft of the outer roller 43 are disposed such that their axial directions are orthogonal to a lead angle at which the plastic strip 100 is to be helically supplied, and are rotatably supported on the gearbox 40. When the hydraulic motor 45 is rotationally driven, the inner roller 42 and the outer roller 43 are rotated in directions opposite to each other via the gear mechanisms 46 that are respectively fixed to an output shaft 451 of the hydraulic motor 45, the rotational shaft of the inner roller 42, and the rotational shaft of the outer roller 43 and are meshed with each other, and the plastic strip 100 is sent out by being sandwiched between the inner roller 42 and the outer roller 43. That is, inner roller 42 is rotated by driving force from the gear mechanisms 46. Further, the inner roller 42 and the outer roller 43 serve to sandwich the plastic strip 100 therebetween to feed out the plastic strip 100.

In the illustrated embodiment, the inner roller 42 has a length at least twice the width dimension of the plastic strip 100, and is formed, for example, of a steel material into a cylindrical shape. Further, the outer diameter of the inner roller 42 is set such that the outer circumferential surface is rotated in contact with a flat inner circumferential surface on which the preceding winding of the plastic strip 100 and the following winding of the plastic strip 100 are joined with each other.

The outer roller 43 is disposed in contact with joint areas where the preceding winding of the plastic strip 100 and the following winding of the plastic strip 100 are adjacent to each other, and orbits in an inner track on the inner surface of the existing pipe 200. The outer roller 43 is provided with, around a columnar shaft portion 432, a plurality of disc-shaped rollers 431 . . . 431 disposed between the ribs 103 of the plastic strip 100. The rollers 431 are each formed to have a width that can be inserted into adjacent ribs 103. Further, the outer diameter sizes of the outer roller 43 and the inner roller 42 are set such that there is an appropriate space between the outer circumferential surface (the outer diameter of the roller 431) of the outer roller 43 and the outer circumferential surface of the inner roller 42 for sandwiching the plastic strip 100.

Figure 8:
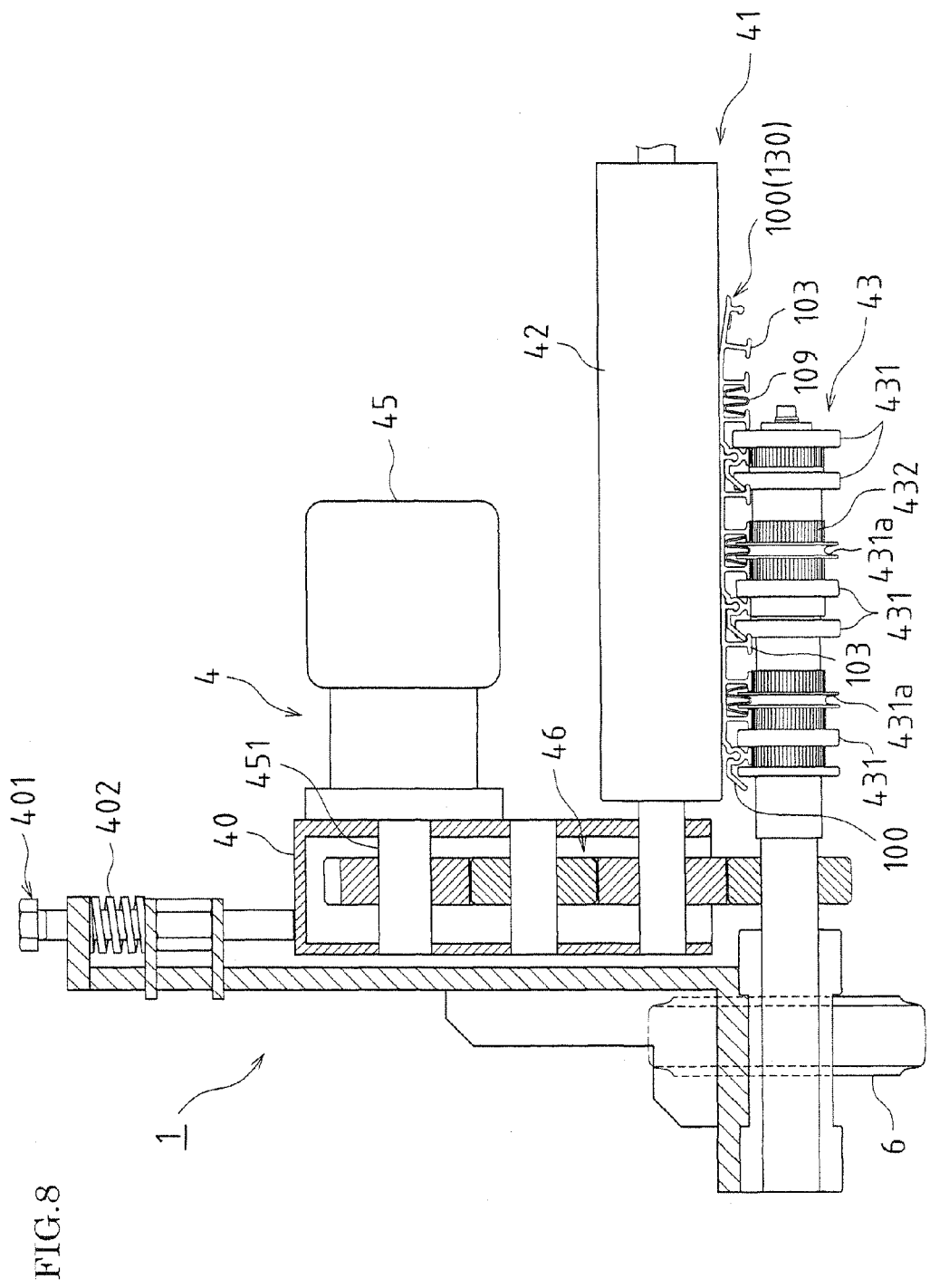
FIG. 8 is a side view showing a pinch roller of the joining mechanism in the above-described winding machine.
Figure 9:
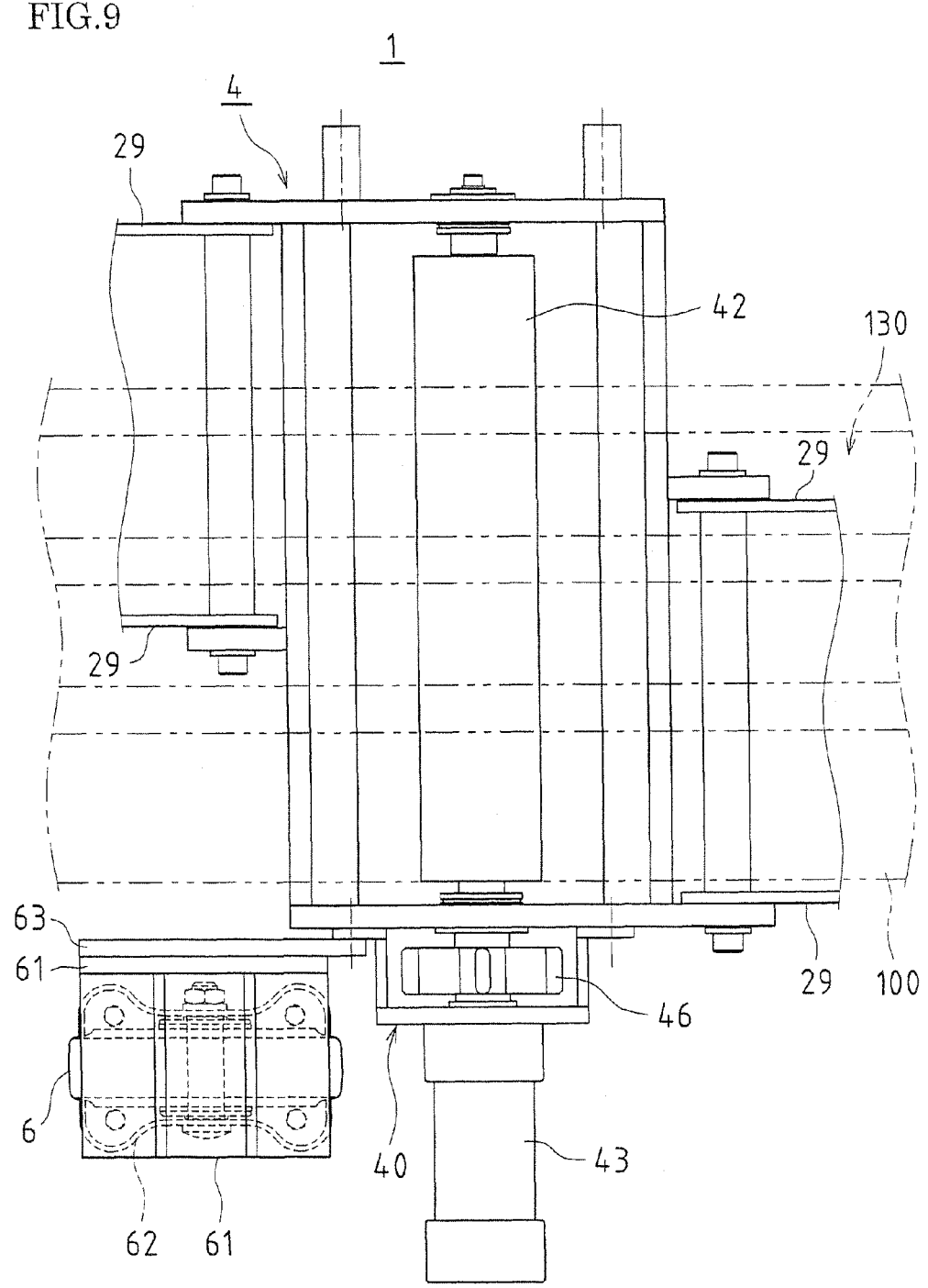
FIG. 9 is a plan view showing a principal part of the joining mechanism and a wheel in the above-described winding machine.

In the example shown in FIG. 8, the reinforcing material 109 is attached to the plastic strip 100. The reinforcing material 109 is formed by bending a strip-shaped steel plate so as to have a substantially W-shape cross section, and is attached between the adjacent ribs 103 of the plastic strip 100 to increase the strength of the rehabilitating pipe 130 to be formed. In this case, of the plurality of rollers 431 of the outer roller 43, rollers 431a each corresponding to the space between the ribs 103 to which the reinforcing material 109 is attached may be provided with a groove portion 433 that is fitted with a convex portion of the reinforcing material 109 of the plastic strip 100.

Such an outer roller 43 is rotated, with tip portions of the ribs 103 of the plastic strip 100 in contact with outer circumferential surface of the shaft portion 432. Preferably, the outer circumferential surface of the outer roller 43 is knurled. In the illustrated embodiment, the outer circumferential surface of the shaft portion 432 is knurled so that the shaft portion 432 is rotated on the plastic strip 100 (the tip portions of the ribs 103) without slippage.

Also, a shock absorbing element 401 including a spring 402 is provided outside the gearbox 40, and therefore projections and depressions or the like on the inner surface of the existing pipe 200 also serve to press the outer surface of the gearbox 40 to maintain the spacing between the inner roller 42 and the outer roller 43.

As shown in FIG. 9, a support that is rotated in contact with the inner surface of the existing pipe 200 is provided at a side portion of such a joining mechanism 4. In the example shown in FIGS. 5 and 6, a wheel 6 serving as the support is provided on the left-hand side of the joining mechanism 4 in the drawings. The wheel 6 is attached to the joining mechanism 40 via a bracket 61. The bracket 61 is formed to have a substantially L-shaped cross section, and is attached to the front surface of a back plate 63 that is joined to a side portion of the gearbox 40. An arm portion 62 is provided extending below the bracket 61, and the wheel 6 is rotatably journaled on the arm portion 62.

As shown in FIGS. 5 and 6, the wheel 6 has a larger diameter than the outer roller 43, and includes a rotational shaft at a location different from that of the rotational shaft of the outer roller 43. The wheel 6 having a larger diameter serves to maintain stability without being affected by projections and depressions or the like on the inner surface of the existing pipe 200. Further, the provision of the rotational shaft of the wheel 6 as a rotational shaft different from that of the outer roller 43 and the inner roller 42 contributes to ensure smooth rotation without placing a burden on the rotational shafts of the outer roller 43 and the inner roller 42.

In the illustrated configuration, the rotational shaft of the wheel 6 is arranged toward the inner surface of the existing pipe 200 than the rotational shaft of the outer roller 43 in the radial direction of the existing pipe 200. In the axial direction of (the length direction) the outer roller 43, the wheel 6 is arranged as close as possible to the center of gravity of the joining mechanism 4. That is, the wheel 6 is provided near to the gearbox 40 and the gear mechanisms 46 on which the outer roller 43 is journaled. Further, in the circumferential direction of the existing pipe 200, the wheel 6 is disposed in such a position that does not being the outer roller 43 into contact with the existing pipe 200.

Such a wheel 6 is attached, via a plurality of long holes 61a provided in the bracket 61, to the back plate 63 provided extending at a side portion of the gearbox 40. The plurality of long holes 61a of the bracket 61 enable adjustment of the attachment height of the wheel 6. That is, as shown in FIG. 6, when the bracket 61 and the back plate 63 are coupled by attaching fastening members at a location toward the upper ends of the long holes 61a, the wheel 6 is supported on the lower side. Conversely, when the bracket 61 and the back plate 63 are coupled at a location toward the lower ends of the long holes 61a, the wheel 6 is supported on the upper side. Thus, by adjusting the coupling position of the bracket 61 and the back plate 63 via the long holes 61a, the attachment height of the wheel 6 can be adjusted, making it possible to adjust the height at which the joining mechanism 4 is supported on the inner surface of the existing pipe 200.

The wheel 6 thus provided is rotated in contact with the inner surface of the existing pipe 200 with the orbital movement of the joining mechanism 4. Further, the wheel 6 supports the joining mechanism 4 such that the joining mechanism 4 is separated from the inner surface of the existing pipe 200, and thus serves to prevent contact between the outer roller 43 and the inner surface of the existing pipe 200 during winding of the rehabilitating pipe 130. Accordingly, depending on the conditions of the inner surface of the existing pipe 200, that is, the conditions of generation of sediment or projections and depressions or the like, it is possible to adjust the attachment height of the wheel 6, thus preventing contact between the outer roller 43 and the inner surface of the existing pipe 200.

Thereby, it is possible to rotate the outer roller 43 without bringing it into contact with the existing pipe 200 in the radial direction of the existing pipe 200. Furthermore, the coupling frames 29 provided extending at opposite side portions of the joining mechanism 4 stably hold the tracks of the gearbox 40 and the wheel 6 with respect to the existing pipe 200. Also, the coupling frames 29 achieve an integral support structure with the joining mechanism 4, and the support structure is provided with the wheel 6 serving as the support. Accordingly, the rotational shafts of the outer roller 43 and the inner roller 42 can be rotated while preventing reaction force or the like received from the existing pipe 200 from acting thereon. Consequently, the load acting on the outer roller 43 is reduced, enabling the winding operation to proceed very efficiently. In addition, the outer roller 43 is supported in an arrangement in which it does not come into contact with the existing pipe 200, and therefore the winding operation can proceed very smoothly without generating a frictional force that affects the driving, regardless of the conditions of the inner surface of the existing pipe 200.

Winding Method

Next, a winding method using the winding machine 1 according to Embodiment 1 and a method for rehabilitating the existing pipe 200 will be described.

As shown in FIG. 1, the existing pipe 200 buried in the ground is provided with manholes 201 and 202 that are spaced by a predetermined distance. In this example, the rehabilitating pipe 130 is produced in the existing pipe 200 using an originating-side manhole 201 on the upstream and a destination-side manhole 202 on the downstream in a region to be treated (rehabilitation region).

First, as preparation before treatment, a drum 91 that is provided with a rotation pedestal and on which the plastic strip 100 has been rolled, a power generator 92, a hydraulic unit 93, and so forth are provided. The drum 91 is installed on the ground on the originating-side manhole 201 side, and the power generator 92 is installed on the ground on the destination-side manhole 202 side.

Prior to the start of treatment, the winding machine 1 and the hydraulic unit 93 are introduced and installed through the originating-side manhole 201 into an upstream end portion of the existing pipe 200 to be rehabilitated. At that time, the frame 2 provided with the rollers 3, the coupling frames 29 coupled to the joining mechanism 4, and so forth may be each disassembled before being introduced, and these may be assembled into the winding machine 1 in the existing pipe 200. The pressure oil hose from the hydraulic unit 93 is connected to the hydraulic motor 45 of the joining mechanism 4 of the winding machine 1.

As for the frame 2, it is preferable that the coupling between a pair of adjacent links 21 is released, so that the plurality of links 21 are introduced as a single line, and the pair of adjacent links 21 are coupled again to form a substantially annular shape. Further, the length of the circumference of the frame 2, i.e., the number of links 21 to be coupled of the winding machine 1 is previously adjusted, depending on the pipe diameter of the rehabilitating pipe 130 that is needed. The winding machine 1 is adjusted such that the helical pitch matches the internal diameter of the existing pipe 200 to be rehabilitated and the width of the plastic strip 100. Further, the attachment height of the wheel 6 is adjusted and the attachment angle of the coupling frames 29 is adjusted by the angle adjustment element 47 such that the outer roller 43 is disposed so as not to come into contact with the inner surface of the existing pipe 200, Upon completion of such a preparatory operation, the plastic strip 100 is pulled out from the inner circumferential side of the drum 91 disposed on the ground and introduced into the originating-side manhole 201. Further, the plastic strip 100 is introduced into the existing pipe 200, passed through the pinch rollers 41 (42, 43) of the joining mechanism 4 of the winding machine 1, and sent out to the outside of the rollers 3 provided in the frame 2.

Then, in a state in which the plastic strip 100 that has been sent out to the outside of the rollers 3 is sandwiched between the inner surface of the existing pipe 200 and the winding machine 1, the winding machine 1 is rotated about the axis of the existing pipe 200 to wind the plastic strip 100 around the frame 2 several turns (1 to 3 turns), thus forming a rehabilitating pipe 130 for starting winding. That is, orbital movement of the winding machine 1 (the joining mechanism 4) causes the joint convex portion 101 of the following helical winding of the plastic strip 100 to be fitted from the inner circumferential side into the joint concave portion 102 of the preceding helical winding of the plastic strip 100, and causes the inclined pieces 108 of adjacent windings of the plastic strip 100 to be locked with the substantially T-shaped tip portions of the ribs 103, thus joining the adjacent helical windings of the plastic strip 100 with each other Upon completion of production of the starting rehabilitating pipe, the joining mechanism 4 of the winding machine 1 is driven. Thereby, the hydraulic motor 45 of the joining mechanism 4 is rotationally driven to rotate the pinch roller 41, and the plastic strip 100 is sandwiched between the pinch roller 41 and sent out. Further, the joining mechanism 4 orbits (revolves) along the plastic strip 100 relatively in a direction that is opposite to the direction in which it is sent out.

At this time, the plastic strip 100 is relatively sent in such that it is arranged adjacent to the starting rehabilitating pipe along the frame 2 and the rollers 3 . . . 3 that orbit by rotation of the pinch roller 41. As shown in FIGS. 2 and 3, the plastic strip 100 is formed into the rehabilitating pipe 130 by joining the joint portions of adjacent helical windings of the plastic strip 100 with each other by causing the joint convex portion 101 to be fitted from the inner circumferential side into the joint concave portion 102 of the plastic strip 100 of the starting rehabilitating pipe and causing the ribs 103 and the inclined pieces 108 to be engaged with each other.

At this time, as shown in FIGS. 5 and 6, the outer roller 43 of the pinch roller 41 orbits while being supported at a position that is separated by a fixed distance from the inner circumferential surface of the existing pipe 200. That is, when rolling on the circumferential surface of the existing pipe 200, the wheel 6, for which the position where the bracket 61 is fixed is adjusted such that the wheel 6 comes into contact with the inner circumferential surface of the existing pipe 200, supports the outer roller 43 of the joining mechanism 4 in a state in which the outer roller 43 is levitated from the inner circumferential surface of the existing pipe 200. The joining mechanism 4 is integrated with the frame 2 by the coupling frames 29 supported on the existing pipe 200 via the rollers 3a and the rehabilitating pipe 130, and is supported in a state of being separated from the inner circumferential surface of the existing pipe 200. The outer roller 43 is prevented from coming into contact with the inner circumferential surface of the existing pipe 200. Furthermore, the pinch roller 41 is also stably supported by the action of the shock absorbing element 401.

Thereby, even if sediment or projections and depressions or the like are present on the inner surface of the existing pipe 200 during the winding operation, the smooth rotation of the inner roller 42 and the outer roller 43 is maintained without being affected thereby, and the orbital movement can be continued while maintaining a constant speed. Accordingly, the winding operation can proceed without applying an excessive load to the outer roller 43.

The joining mechanism 4 joins the following helical winding of the plastic strip 100 with the preceding helical winding of the plastic strip 100 to form a rehabilitating pipe 130, while orbiting along the inner circumferential surface of the existing pipe 200. That is, the winding machine 1 forms the plastic strip 100 into a rehabilitating pipe 130, and at that time, moves (revolves) along the inner circumferential surface of the existing pipe 200 and is moved in the axial direction of the existing pipe 200 toward the destination-side manhole 202.

Figure 10:
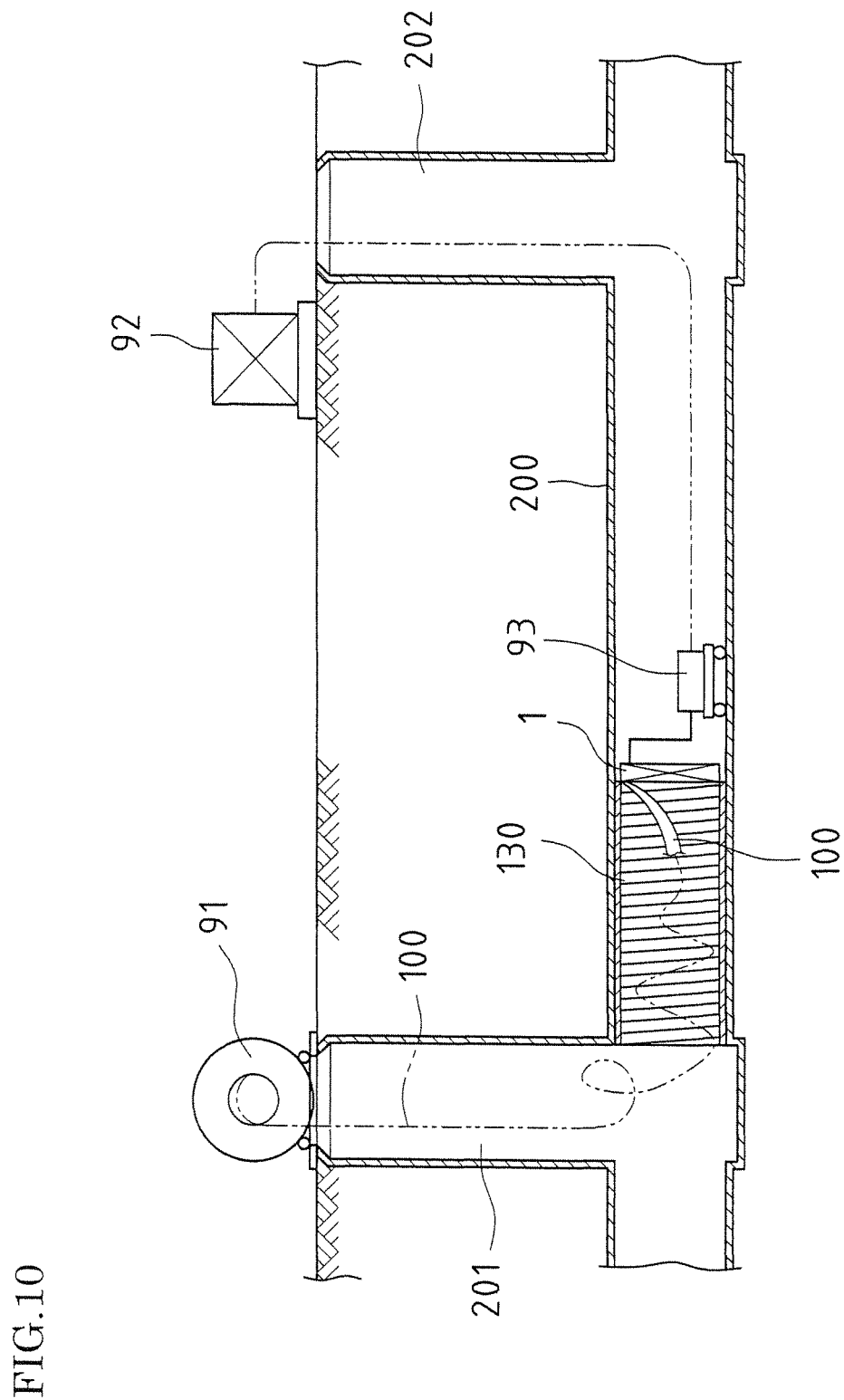
FIG. 10 is an explanatory diagram showing a winding method using a winding machine according to an embodiment of the present invention.

Thus, the rehabilitating pipe 130 is disposed in the existing pipe 200 without being rotated, and is successively and additionally formed, from the state shown in FIG. 1 to the state shown in FIG. 10. That is, a helical winding of the plastic strip 100 for the rehabilitating pipe 130 is further supplied and formed into a tubular shape, and the rehabilitating pipe 130 is additionally formed in the axial direction toward the destination-side manhole 202.

When the winding for the rehabilitating pipe is completed over the whole length of a rehabilitation region to be treated of the existing pipe 200, the plastic strip 100 at a pipe end portion of the rehabilitating pipe 130 is cut. Then, the winding machine 1 is disassembled, and the apparatuses, such as the winding machine 1, the hydraulic unit 93 and the like, are removed. Since the frame 2 is formed by coupling the plurality of links 21 to each other, the frame 2 can be removed as a single line of the links 21 by releasing the coupling between a pair of adjacent links 21.

Figure 11:
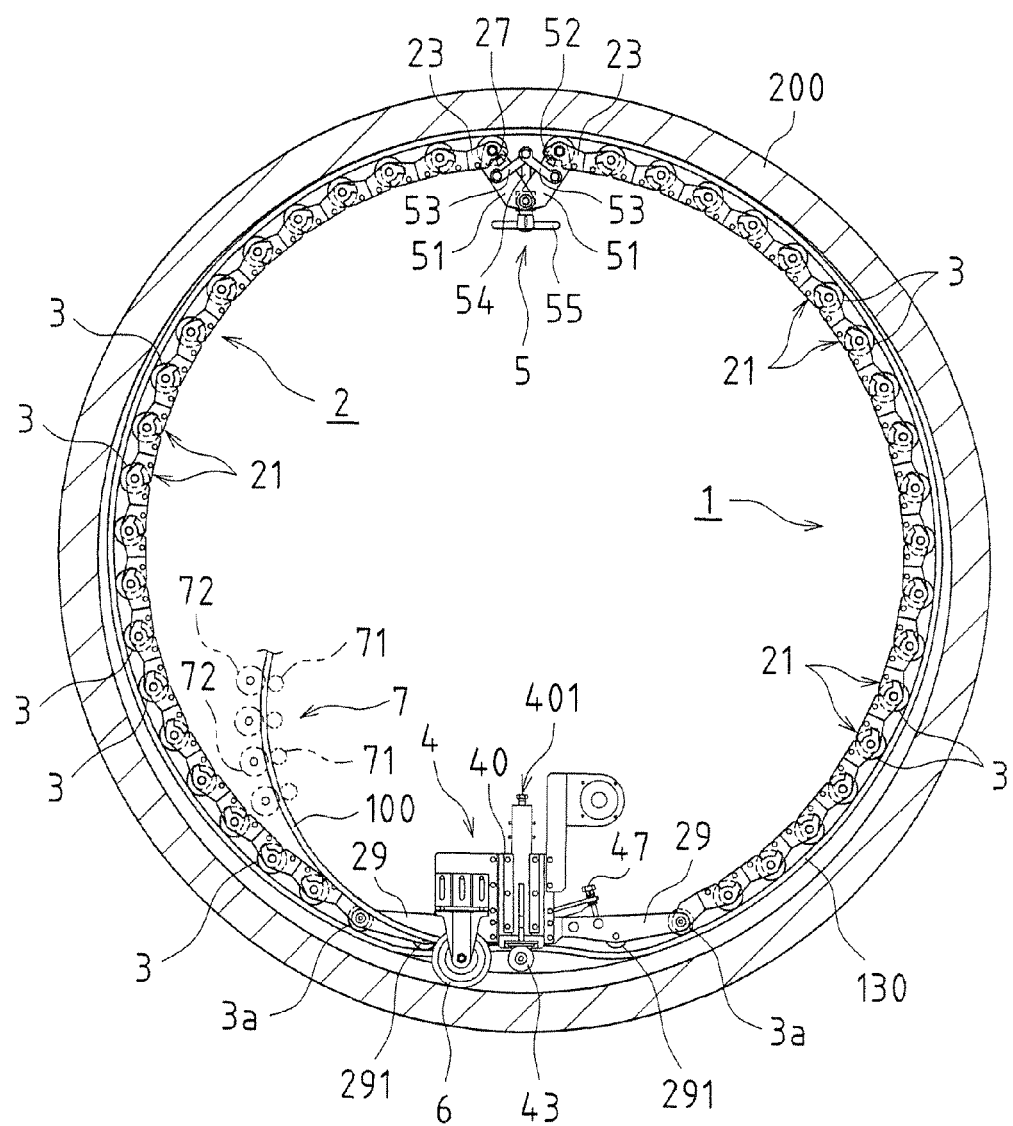
FIG. 11 is a front view showing another configuration of the winding machine according to Embodiment 1.

As shown in FIG. 11, the winding machine 1 causes the plastic strip 100 supplied to the joining mechanism 4 to pass through a fixed path, and therefore may have a configuration in which a guide 7 is further provided. FIG. 11 is a front view showing an example of a winding machine 1 including a guide 7.

As described above, the plastic strip 100 is pulled out from the inner circumferential side of the winding drum 91 installed on the ground, pulled into the existing pipe 200, and introduced into the joining mechanism 4. However, at that time, by maintaining the supply path to the joining mechanism 4 constant by the guide 7, the winding operation can proceed even more stably.

In this case, the guide 7 includes a pair of regulating rollers 71, 72 that are arranged inside the frame 2, make abutment with the inside and the outside (the front surface and the back surface) of the plastic strip 100 and are rotated. The regulating rollers 71, 72 are formed by a pair of a cylindrical inner roller 71 that is rotatably journaled on a frame (not shown) and abuts a flat surface of the plastic strip 100, and an outer roller 72 that is rotated in abutment with the rib surface of the plastic strip 100.

The pair of regulating rollers 71, 72 is not limited to a single pair, and the provision of a plurality of pairs of regulating rollers 71, 72 in the frame 2 enables the supply path of the plastic strip 100 to be defined. This can prevent a force that impedes the pulling-in from acting on the plastic strip 100, thus supplying the plastic strip 100 to the pinch roller 41 smoothly at a constant feeding speed. Consequently, the joint portions of the plastic strip 100 can be joined with each other at a constant speed, thus preventing the phenomenon of increasing winding growth in which the pipe diameter of the rehabilitating pipe 130 gradually increases during the winding process, thus stably performing winding by maintaining a pipe diameter with a fixed size.

As described above, the guide 7 is freely detachable from the frame 2 by the plurality of sets of regulating rollers 71, 72 journaled on a frame member (not shown). Alternatively, it is possible to adopt a configuration in which the pairs of the regulating rollers 71, 72 are housed in frame members on a pair-by-pair basis, and these are detachably coupled to the frame 2.

It is also possible to adopt a configuration in which a driving source is connected to the guide 7 such that the above-described pair of regulating rollers are rotationally driven in directions opposite to each other, and the plastic strip 100 is sandwiched therebetween and is sent out to the joining mechanism 4. In addition, the guide 7 is not limited to configurations using the regulating rollers, and may have, for example, a configuration in which a plurality of regulating elements such as rotatable rollers for holding the plastic strip 100 so as to follow the guide plate are provided in a curved guide plate forming a supply path of the plastic strip 100, and the plastic strip is passed through between the guide plate and the regulating elements and guided to the joining mechanism 4.

With the above-described configuration, the winding machine 1 increases the stiffness of the joining mechanism 4 in an area around the outer roller 43 to which an excessive load is applied, thus making it possible to avoid contact between the outer roller 43 and projections and depressions, an obstacle, or the like and the inner wall of the existing pipe 200 and to prevent a damage to the outer roller 43 to the fullest extent. Accordingly, the winding machine 1 can increase the operational efficiency and can be smoothly driven.

(Embodiment 2)

Next, a winding machine according to Embodiment 2 will be described.

Figure 12:
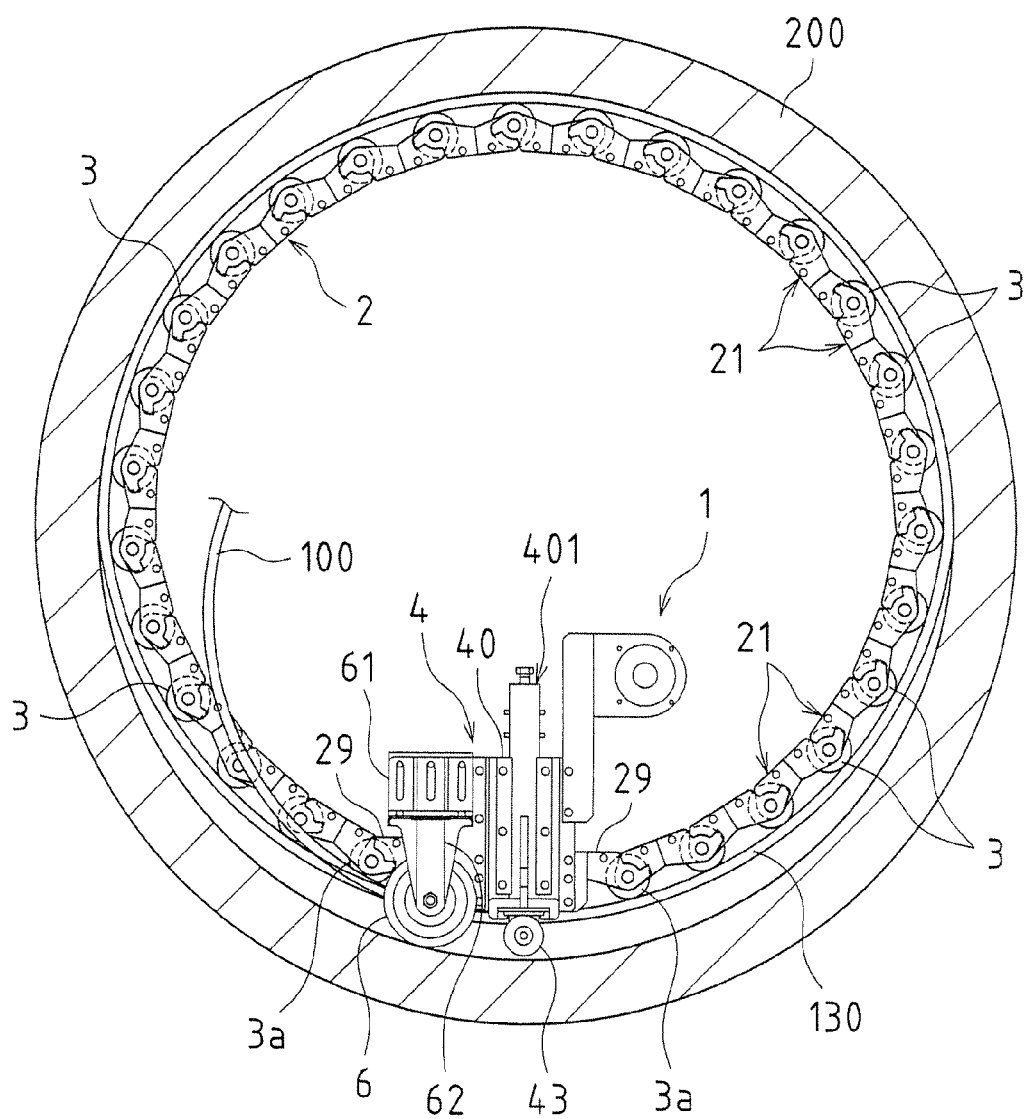
FIG. 12 is a front view showing a winding machine according to Embodiment 2.

FIG. 12 is a front view showing a winding machine according to Embodiment 2.

The feature of a winding machine 1 according to Embodiment 2 as compared to Embodiment 1 described above lies in the configuration of the coupling frames 29 of the frame 2. The method for winding the same can be performed in the same manner as that described above. Therefore, in the following description, the coupling frames 29 of the winding machine 1 will be described in detail and a detailed description of the configurations of other portions is omitted by using the same reference numerals as those of Embodiment 1.

The existing pipe 200 shown in FIG. 12 is formed to have a smaller diameter than the example shown in FIG. 5. In the case of the existing pipe 200 having a smaller diameter, the frame 2 of the winding machine 1 is disposed so as to form a smaller annular shape. That is, the frame 2 is formed to have a substantially annular shape by the smaller number of links 21 . . . 21 than the frame 2 of Embodiment 1.

The joining mechanism 4 is provided in the frame 2 via the coupling frames 29. As shown in the drawing, first end portions of the coupling frames 29 are rotatably coupled to the links 21. Second end portions of the coupling frames 29 are joined and fixed to a side portion of the joining mechanism 4 at substantially right angles.

The coupling frames 29 are formed to have a length that is substantially the same as the length of the link frames 23 constituting the links 21. As shown in FIG. 12, the coupling frames 29 are arranged so as to form a chord with respect to the inner arc shape of the existing pipe 200 via rollers 3a. The joining mechanism 4 is supported on the existing pipe 200 via the rollers 3a (and the rehabilitating pipe 130) by the short coupling frames 29 and the wheels 6 serving as the supports. Thereby, the joining mechanism 4 is integrated with the frame 2, and is supported in a state of being separated from the inner circumferential surface of the existing pipe 200 by a fixed distance.

This allows the frame 2 of the winding machine 1 to be installed in the existing pipe 200 in correspondence with the existing pipe 200 having a small diameter. As for the frame 2, the coupling between a pair of adjacent links 21 can be released, so that the plurality of links 21 are introduced as a single line, and a pair of adjacent links 21 can be coupled again to form a substantially annular shape. Further, by adjusting the attachment height of the wheel 6 via the long holes of the bracket 61, it is possible to perform an adjustment such that the outer roller 43 does not come into contact with the inner surface of the existing pipe 200.

In the winding machine 1 as well, the chain link 5 whose diameter can be increased or decreased by changing its bent shape, or in other words, by being opened or closed may be provided at an appropriate location of the frame 2 as with Embodiment 1.

Due to the wheels 6, the winding machine 1 can obtain a sufficient reaction force from the existing pipe 200, and therefore the coupling frames 29 provided extending on the joining mechanism 4 can be short if the number of steps or projections and depressions or the like on inner surface of the existing pipe 200 is small. As with Embodiment 1, this also makes it possible to increase the stiffness of the joining mechanism 4 in an area around the outer roller 43 to which an excessive load is applied and to support the outer roller 43 so as to be separated from the inner surface of the existing pipe 200 such that contact between the outer roller 43 and projections and depressions, an obstacle, or the like and the inner surface of the existing pipe 200 is avoided. Thereby, the winding machine 1 can be driven smoothly. Note that as for the illustrated existing pipe 200 having a small diameter, the length of the coupling frames 29 of the winding machine 1 can be decreased to about 10 mm.

(Embodiment 3)

Next, a winding machine according to Embodiment 3 will be described.

Figure 13:
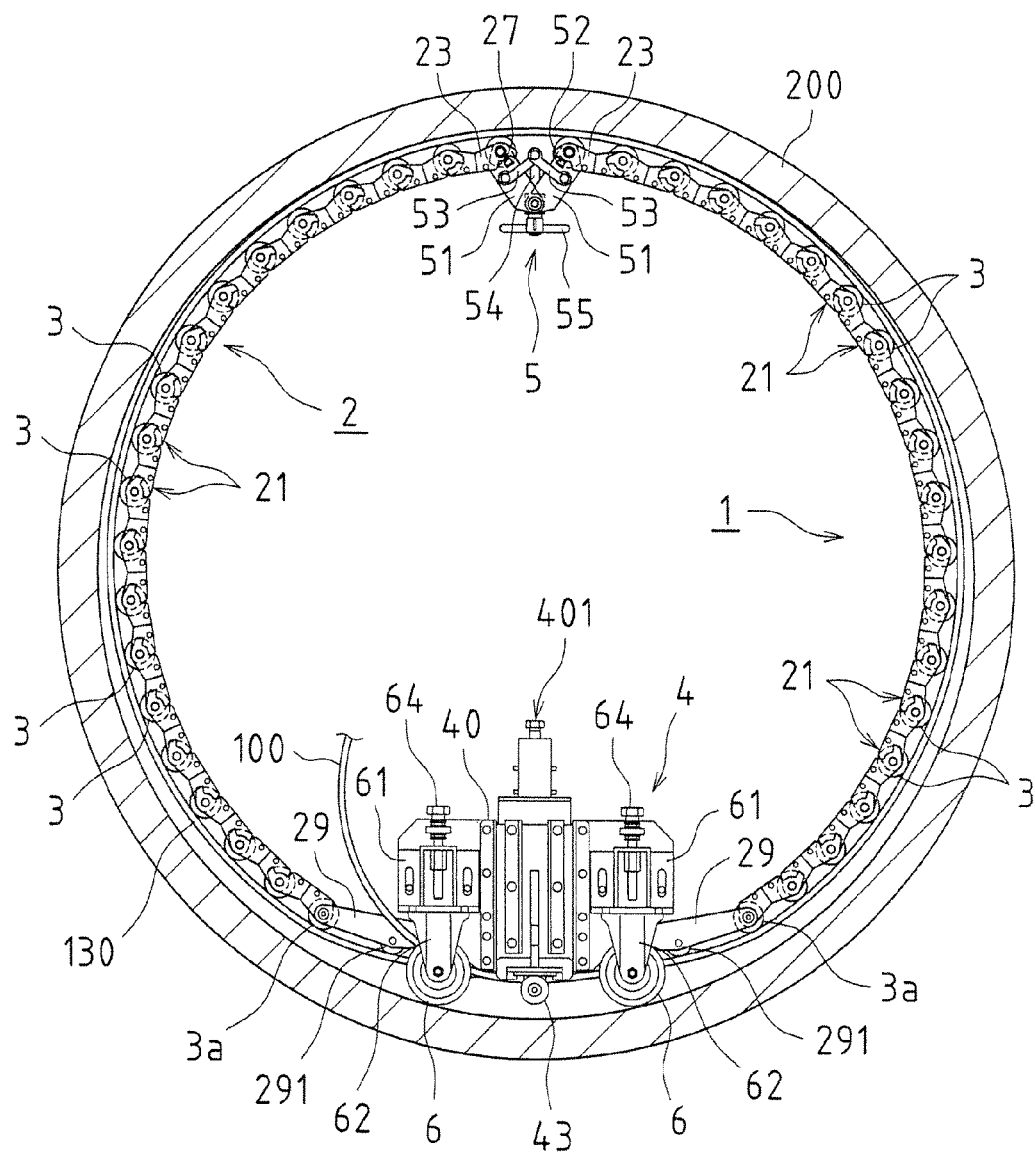
FIG. 13 is a front view showing a winding machine according to Embodiment 3.
Figure 14:
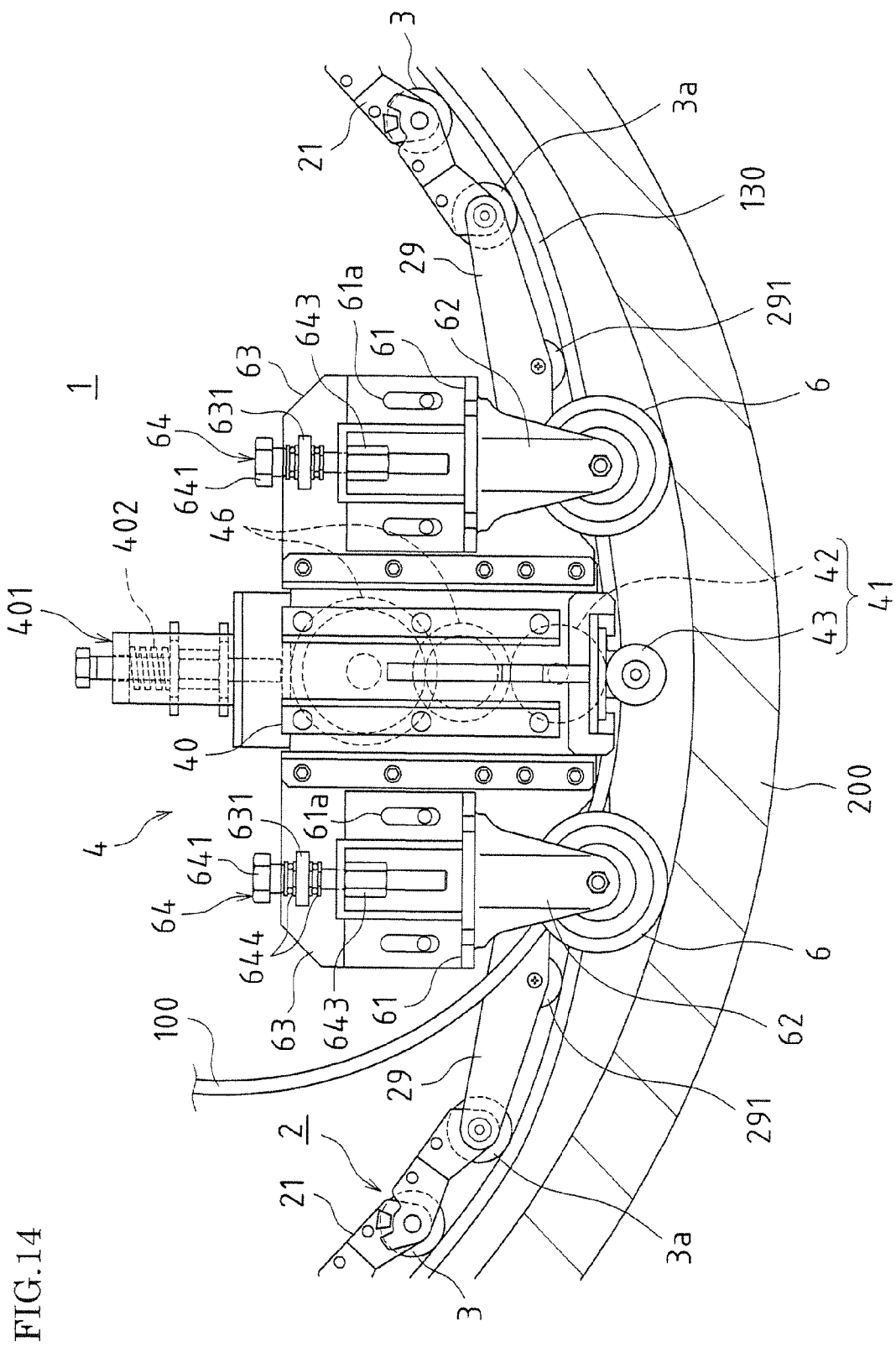
FIG. 14 is an explanatory diagram showing, in enlargement, a joining mechanism in the winding machine in FIG. 13.
Figure 15:
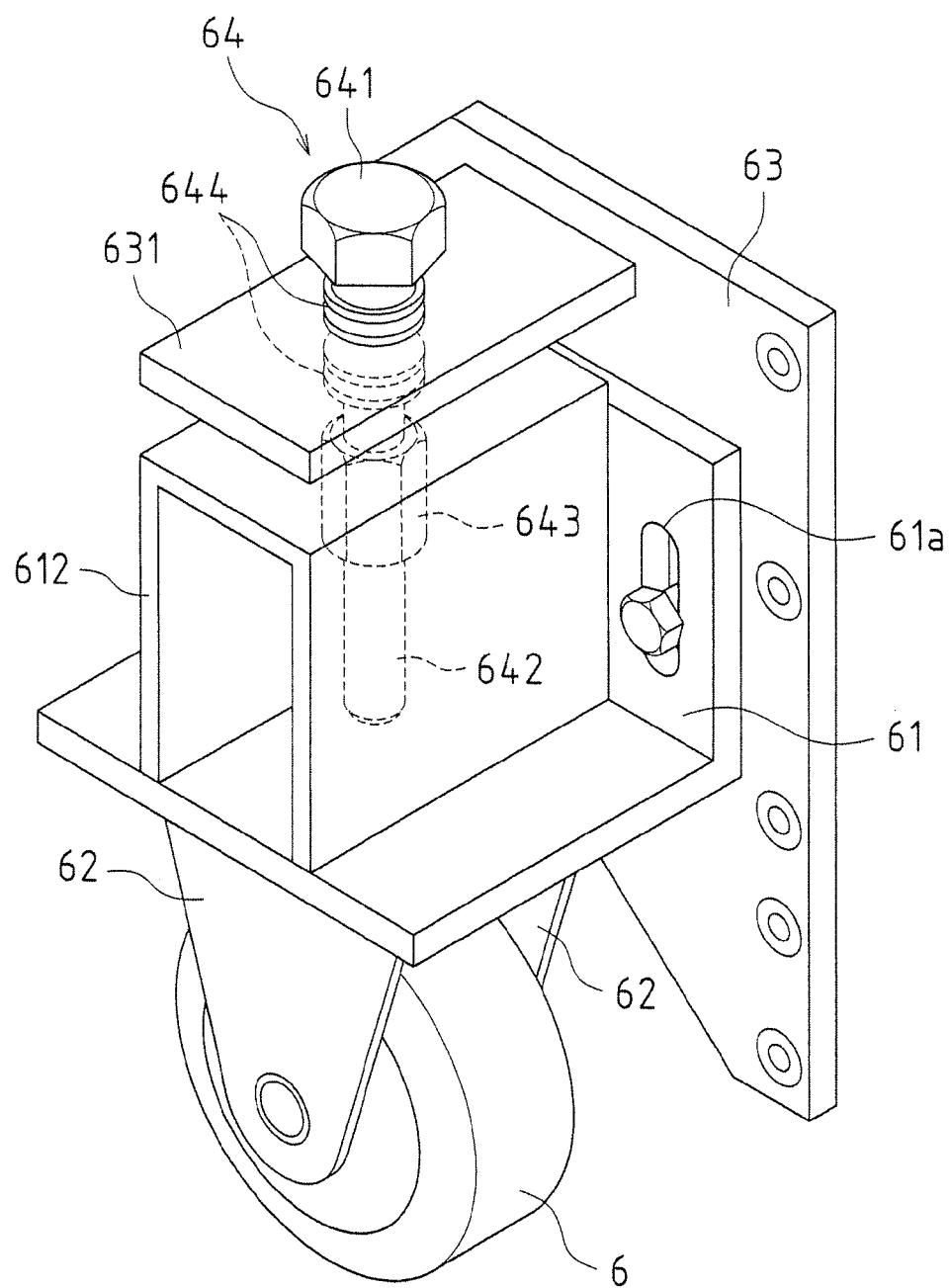
FIG. 15 is a perspective view showing a wheel portion in the winding machine shown in FIG. 13.

FIG. 13 is a front view showing a winding machine according to Embodiment 3, FIG. 14 is an explanatory diagram showing, in enlargement, a joining mechanism of the winding machine in FIG. 13. FIG. 15 is a perspective view showing a support structure of a wheel.

Note that the feature of a winding machine 1 according to Embodiment 3 and Embodiment 4 that follows, as compared to Embodiment 1 described above lies in the structure of the joining mechanism 4. The method for winding the same can be performed in the same manner as that described above. Therefore, the following description focuses on the joining mechanism 4, and a detailed description of the configurations of other portions is omitted by using the same reference numerals as those of Embodiment 1.

In the winding machine 1 shown in FIGS. 13 and 14, the joining mechanism 4 is provided with two wheels 6 as the support. As illustrated in detail in FIG. 14, in the joining mechanism 4 includes a pinch roller 41 made up of an inner roller 42 that is rotatably journaled on the inside of the gearbox 40 and an outer roller 43 that is arranged on the outside of the gearbox 40, and driving force from the gear mechanisms 46 causes the pinch roller 41 to be rotated such that the plastic strip 100 is sandwiched and sent out. Also, in the gearbox 40 of the joining mechanism 4, the wheels 6 are respectively arranged on both front and rear sides of back in the rotation direction of the outer roller 43.

As with Embodiment 1, each of the wheels 6 is rotatably journaled on the arm portion 62 provided extending below the bracket 61. The bracket 61 is attached to the back plate 63 joined at a side portion of the gearbox 40. Both of the wheels 6 have a larger diameter than the outer roller 43, and are configured to support the joining mechanism 4 on the inner surface of the existing pipe 200 and to be rotated in contact with the inner surface of the existing pipe 200. Thereby, the joining mechanism 4 is stably supported on the inner surface of the existing pipe 200 also by the two wheels 6.

Each wheel 6 is attached to the back plate 63 via the two long holes 61a provided in the bracket 61. By adjusting the attachment position of the wheels 6 via the long holes 61a, it is also possible to change the positions of the rotational shafts of the wheels 6 with respect to the radial direction of the existing pipe 200.

Furthermore, the bracket 61 is provided with an adjustment mechanism 64 for adjusting the attachment height of the wheels 6. As shown in FIG. 15, the adjustment mechanism 64 includes an adjusting bolt 641 and a lock nut 643. The adjusting bolt 641 includes bolt shaft portion 642 that is threadedly engaged with the lock nut 643. A support plate 631 extends from the back plate 63. The bolt shaft portion 642 is passed through the support plate 631, and the tip portion of the bolt shaft portion 642 is further inserted into a box 612 provided at the central portion of the bracket 61. Inside the box 612, the lock nut 643 is threadedly engaged with the bolt shaft portion 642. Also, at the top surface portion and the bottom surface portion of the support plate 631, thrust bearings 644 are fitted onto the bolt shaft portion 642.

Thereby, the attachment height of the bracket 61 and the back plate 63 (the spacing between the bottom surface of the support plate 631 and the top surface of the box 612) can be readily changed by the operation of rotating the adjusting bolt 641, thus enabling the attachment height of the wheel 6 to be adjusted.

The joining mechanism 4 is supported by the coupling frames 29 provided extending from its opposite side portions, and therefore can, with the action of the two wheels 6, prevent contact between the outer roller 43 of the winding machine 1 and the inner surface of the existing pipe 200. Accordingly, in the frame 2, the joining mechanism 4 can be supported even more stably, enabling the winding operation to proceed efficiently.

When the joining mechanism 4 orbits inside the inner surface of the existing pipe 200, it does not hinder the rotation of the outer roller 43, so that the outer roller 43 can be smoothly rotated together with the inner roller 42, making it possible to join joint portions of the plastic strip 100 on the inside of the outer diameter of the rehabilitating pipe 130.

Further, as shown in FIG. 14, the joining mechanism 4 is supported on the inner surface of the existing pipe 200 at two points. Accordingly, even if sediment, an obstacle such as a pebble, projections and depressions, or the like are present in the existing pipe 200 during the process of winding the rehabilitating pipe 130, the winding can proceed without any affect on the outer roller 43 being rotated, making it possible to perform the operation very efficiently.

(Embodiment 4)

Next, a winding machine according to Embodiment 4 will be described.

Figure 16:
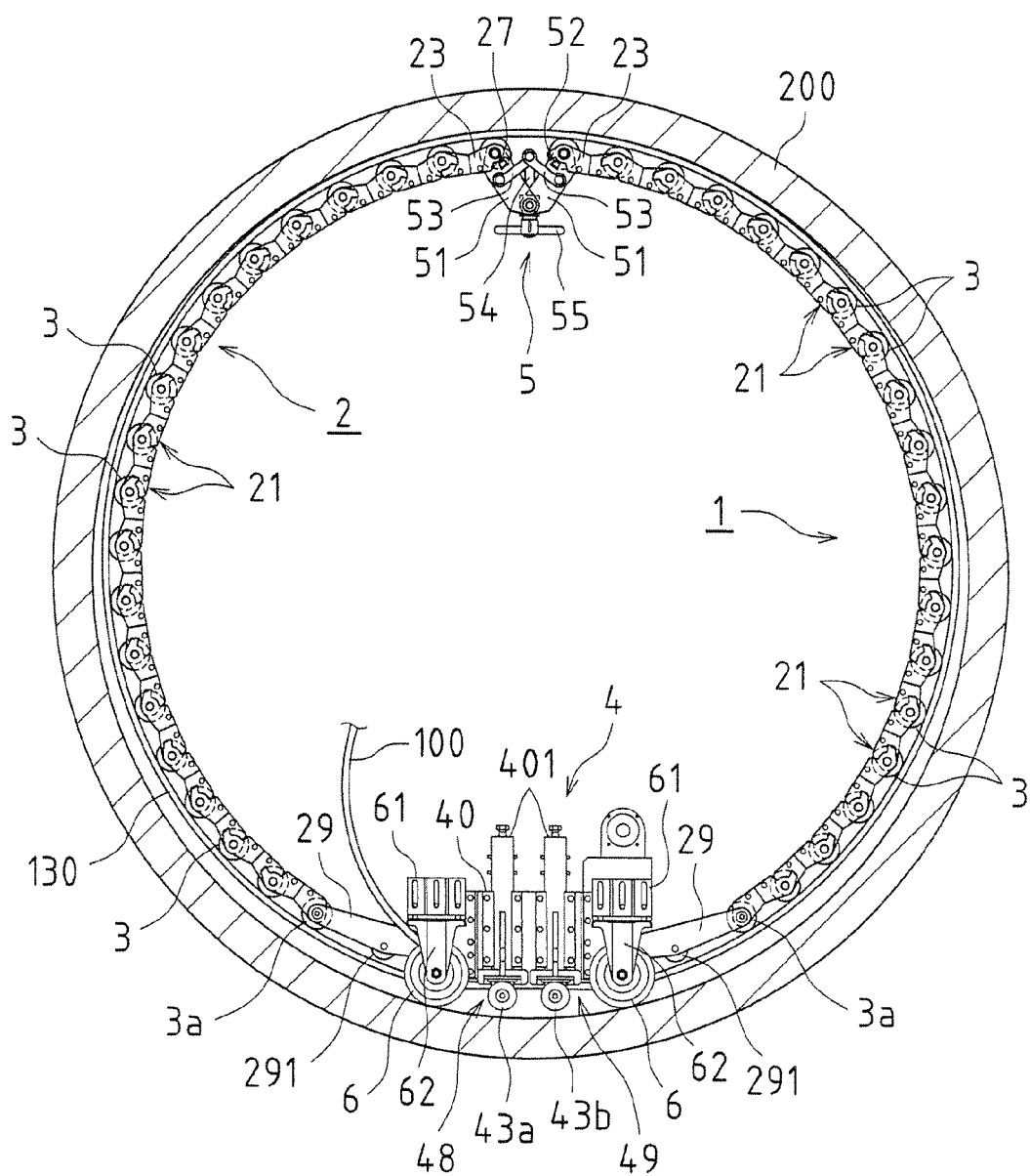
FIG. 16 is a front view showing a winding machine according to Embodiment 4.
Figure 17:
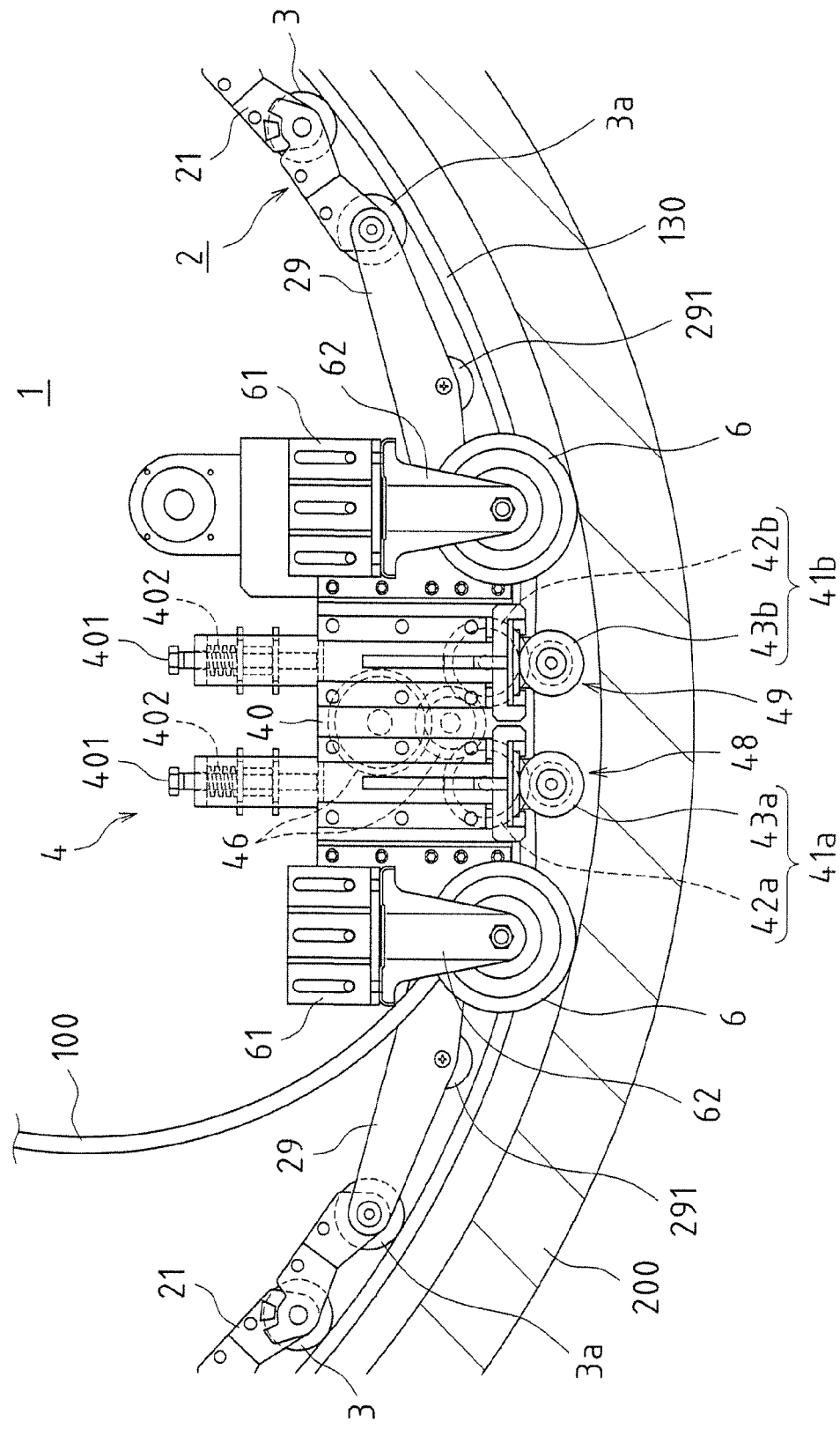
FIG. 17 is an explanatory diagram showing, in enlargement, a joining mechanism of the winding machine shown in FIG. 16.
Figure 18:
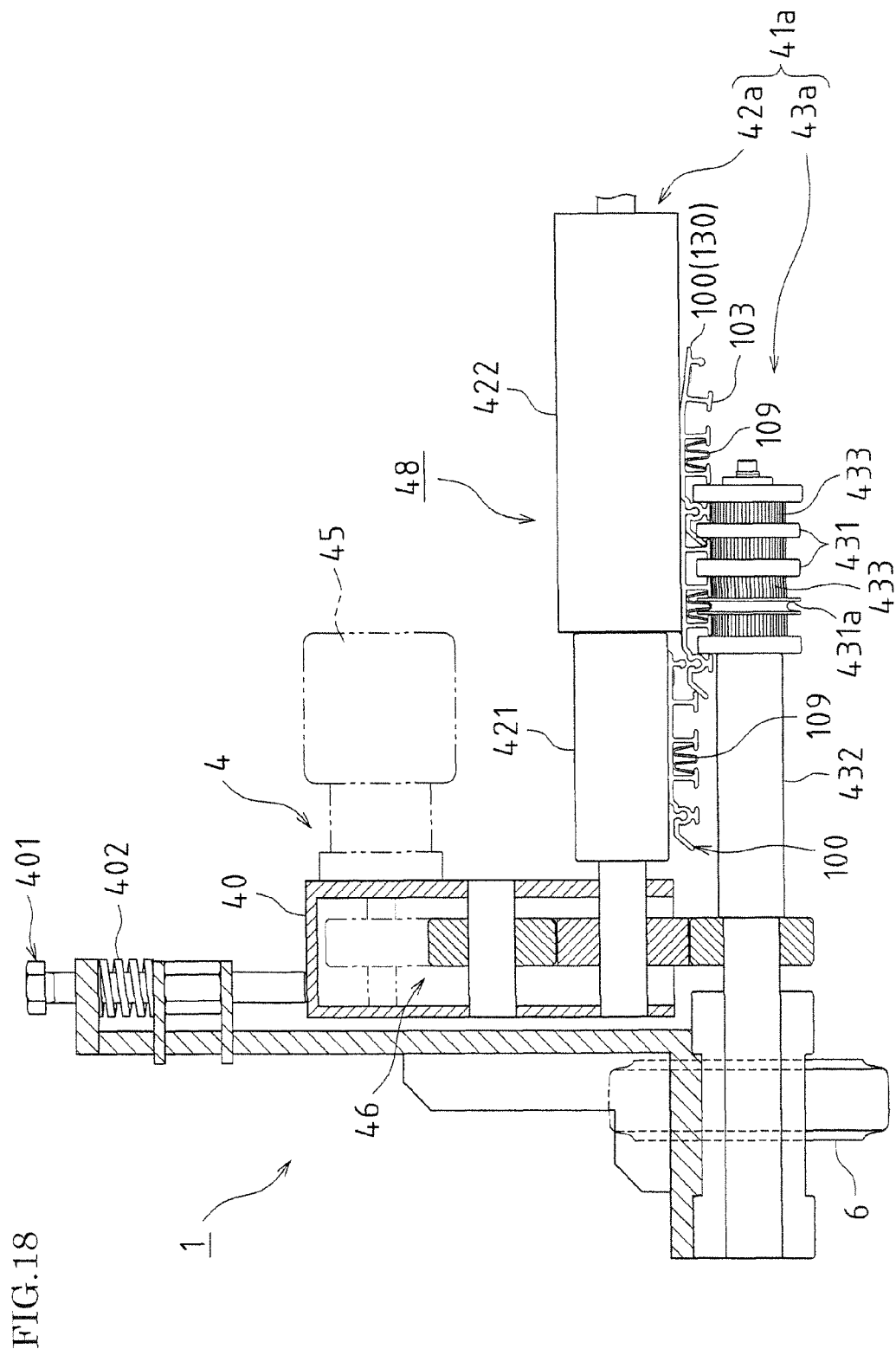
FIG. 18 is a side view showing a drive unit of the above-described joining mechanism.
Figure 19:
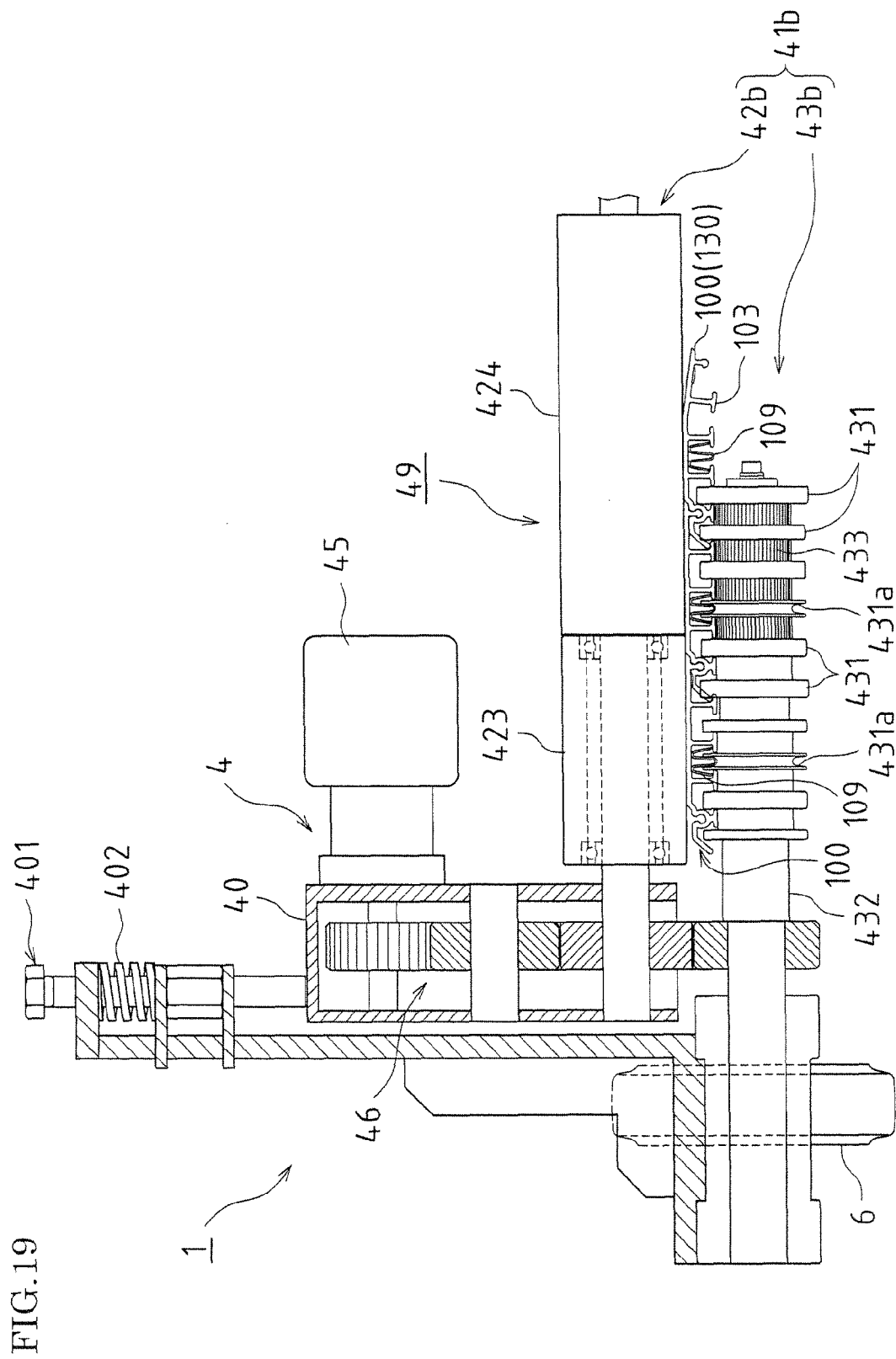
FIG. 19 is a side view showing a fit unit of the joining mechanism.

FIGS. 16 to 19 show a winding machine according to Embodiment 4, with FIG. 16 being a front view of the winding machine, FIG. 17 being an explanatory diagram showing a joining mechanism in enlargement, FIG. 18 being a side view showing a drive unit of the joining mechanism, and FIG. 19 being a side view showing a fit unit of the joining mechanism.

The joining mechanism 4 includes a drive unit 48 that serves to cause the frame 2 to orbit along the inner surface of the existing pipe 200, and a fit unit 49 that joins joint portions of the plastic strip 100 with each other by fitting. Each of the drive unit 48 and the fit unit 49 is composed mainly of a pinch roller including an inner roller and an outer roller that are paired with each other.

As shown in FIGS. 16 and 17, the drive unit 48 includes a pinch roller 41a made up of an inner roller 42a and an outer roller 43a. The fit unit 49 includes a pinch roller 41b made up of an inner roller 42b and an outer roller 43b.

In the drive unit 48 and the fit unit 49, the pinch rollers 41a, 41b include a portion corresponding to the second and later turns, which have been already wound, of the plastic strip 100 (rehabilitating pipe 130) and a portion corresponding to the first turn, which is new, of the plastic strip 100 that have structures different from each other, and thereby the feeding speed of the plastic strip 100 to the rehabilitating pipe 130 is maintained constant. Thus, joint portions of windings of the plastic strip 100, 100 are joined with each other without becoming loose.

As shown in FIG. 18, the drive unit 48 includes, as the pinch roller 41a, the inner roller 42a and the outer roller 43a.

The inner roller 42a includes two cylindrical rollers having different diameters (first roller portion 421, second roller portion 422) on the same shaft, and the second roller portion 422 is formed to have a lager diameter than the first roller portion 421. The outer circumferential surfaces of the first roller portion 421 and the second roller portion 422 are both made of a plastic-based material having elasticity such as rigid urethane rubber or silicon resin, or a synthetic rubber-based material.

The outer roller 43a includes a small-diameter cylindrical body 432 in an approximately half portion located toward the base portion (corresponding to the width of the first turn of the plastic strip 100) and includes a plurality of disc-shaped roller portions 431 . . . 431 around the outer circumference of the cylinder main body 433 in an approximately half portion located toward the tip (corresponding to the width of the second turn of the plastic strip 100). The roller portions 431 . . . 431 are provided at spacing such that they are fitted into the grooves between the ribs 103, 102 of the plastic strip 100, and are rotated in contact with the outer circumferential surface of the plastic strip 100 that has been already wound and joined. Of the plurality of roller portions 431, rollers 431a each corresponding to the space between the ribs 103, 102 to which the reinforcing material 109 is attached are each provided, in the circumferential surface, with a groove that is fitted with the convex portion of the reinforcing material 109 of the plastic strip 100. The surface of the cylinder main body 433 is knurled so as to prevent slippage with the plastic strip 100 by coming into contact with the tip portions of the substantially T-shaped ribs 103 of the plastic strip 100.

In the approximately half portion located toward the base portion (the first roller portion 421 side), the outer roller 43a and the inner roller 42a are separated by a distance greater than the thickness of the plastic strip 100 and do not have the function of sandwiching the plastic strip 100. In contrast, in the approximately half portion located toward the tip (the second roller portion 422 side), the outer roller 43a and the inner roller 42a serve to press the plastic strip 100 by sandwiching the plastic strip 100 therebetween. Accordingly, the first turn of the plastic strip 100, which is newly supplied to the joining mechanism 4, directly passes through between the first roller portion 421 of the inner roller 42a and the outer roller 43a without being sandwiched therebetween, and moves to the adjacent fit unit 49.

Between the second roller portion 422 of the inner roller 42a and the outer roller 43a, the plastic strip 100 that has been wound one turn along the existing pipe 200 is fed with the joint portions joined with each other, and is sandwiched between the second roller portion 422 and the outer roller 43a. The inner roller 42a is rotationally driven, and the sandwiched plastic strip 100 (rehabilitating pipe 130) can be supported without slippage because the outer roller 43a is knurled. Thus, reaction force generated when the plastic strip 100 is sent out from between the second roller portion 422 of the inner roller 42a and the outer roller 43a causes the joining mechanism 4 and the frame 2 to orbit (revolve) in a direction opposite to the direction in which the plastic strip 100 is fed. Thereby, the drive unit 48 drives the winding machine 1 into the existing pipe 200.

As shown in FIG. 19, the fit unit 49 includes as the pinch roller 41b, the inner roller 42b and the outer roller 43b.

The inner roller 42b is formed of a first roller portion 423 and a second roller portion 424 having the same diameter. The inner roller 42b joins the joint portions of the plastic strip 100 with the first roller portion 423, and comes into contact with the second and later turns of the plastic strip 100 (the end portions of the rehabilitating pipe 130), which have been already joined, with the second roller portion 424.

The first roller portion 423 is arranged on the rotational shaft of the inner roller 42b via a bearing mechanism, and is rotatably journaled. Thereby, the first roller portion 423 is rotated without any resistance generated between the plastic strip 100 and itself, and sandwiches the plastic strip 100 between the outer roller 43b and itself.

The outer roller 43b includes a plurality of disc-shaped roller portions 431 . . . 431 corresponding to the ribs of the plastic strip 100. In the outer roller 43b, it is not particularly necessary for the roller portions 431 . . . 431 to abut against the plastic strip 100, and the roller portions 431 . . . 431 are arranged so as to be positioned by fitting into the groove portions between the ribs 103, 102. In a region of the outer roller 43b that faces the second roller portion 424 of the inner roller 42b, the outer circumferential surface of the cylinder main body 433 is knurled.

The inner roller 42b and the outer roller 43b sandwich the plastic strip 100 that has passed through the drive unit 48, and join the joint portions with each other. Since the first roller portion 423 of the inner roller 42b is rotatable, it is possible to smoothly feed the plastic strip 100 and join the joint portions with each other. At this time, the joint convex portions 101 of the first turn of the plastic strip 100 are fitted with the joint concave portions 102 of the adjacent second turn of the plastic strip 100, and the inclined pieces 108 are fitted with the tip portions of the ribs 103. Thereby, the joint portions of the plastic strip 100 are joined with each other, thus forming the rehabilitating pipe 130.

Since the first roller portion 423 of the inner roller 42b is rotatable, there will be no speed difference between the first turn of the plastic strip 100 and the second and later turns of the plastic strip 100, making it possible to prevent the phenomenon of increasing winding growth of the rehabilitating pipe 130. Consequently, the joint portions of the rehabilitating pipe 130 are closely attached together with its pipe diameter maintained constant, and therefore can be formed into a high-precision pipe structure having a high water leakage prevention performance.

Thus, in Embodiment 4, a configuration in which only the pinch roller 41a of the drive unit 48 is driven is adopted for the joining mechanism 4, and thereby the winding operation can be smoothly performed without producing a speed difference between the first turn of the plastic strip 100 and the second and later turns of the plastic strip 100. Note that it is also possible to adopt a configuration in which both of the pinch rollers 41a, 41b of the drive unit 48 and the fit unit 49 of the joining mechanism 4 are driven. This is effective when producing several windings of the winding starting rehabilitating pipe 130, enabling the initial winding to be performed even more smoothly with good operability. As the pinch roller of the joining mechanism 4, it is also possible to adopt a pinch roller having a conventional structure having both the function of fitting joint portions and the function of driving the frame.

As shown in FIG. 17, the pinch rollers 41a, 41b are journaled on the gearbox 40 via the gear mechanisms 46. The rotational shafts of the inner rollers 42a, 42b and the rotational shafts of the outer rollers 43a, 43b are disposed such that their axial directions are orthogonal to a lead angle at which the plastic strip 100 is to be helically supplied. When the hydraulic motor 45 is rotationally driven, the rotational shafts of the inner rollers 42a, 42b and the rotational shafts of the outer rollers 43a, 43b are rotated in directions opposite to each other via a gear fixed to the output shaft of the hydraulic motor 45 and a gear meshed therewith, thus operating the pinch rollers 41a, 41b.

A shock absorbing element 401 including a spring 402 is provided outside the gearbox 40, and therefore projections and depressions or the like on the inner surface of the existing pipe 200 also serve to press the outer surface of the gearbox 40 to maintain the spacing between the inner rollers 42a, 42b and the outer rollers 43a, 43b.

As shown in FIGS. 16 and 17, the wheels 6 are provided at side portions of the joining mechanism 4. The brackets 61 are attached to the side surfaces of the gearbox 40, and the wheels 6 are provided rotatably via support elements 62 provided extending below the brackets 61.

The wheels 6 have a larger diameter than the diameter of the outer rollers 43a, 43b, and include rotational shafts at positions different from the rotational shafts of the outer rollers 43a, 43b. Thereby, the wheels 6 support the joining mechanism 4 on the inner surface of the existing pipe 200 without causing the outer rollers 43a, 43b to come into contact with the existing pipe 200.

In the illustrated configuration, the rotational shafts of the wheels 6 are arranged toward the inner surface of the existing pipe 200 than the rotational shafts of the outer rollers 43a, 43b in the radial direction of the existing pipe 200. In the axial direction of (the length direction) the outer rollers 43a, 43b, the wheels 6 are arranged as close as possible to the center of gravity of the joining mechanism 4. That is, the wheels 6 are provided near to the gearbox 40 and the gear mechanisms 46 on which the outer rollers 43a, 43b are journaled. Further, in the circumferential direction of the existing pipe 200, the two wheels 6 are disposed in such a position that does not bring the outer rollers 43a, 43b into contact with the existing pipe 200.

Such wheels 6 are rotated in contact with the inner surface of the existing pipe 200 with orbital movement of the joining mechanism 4. Since the wheels 6 support the joining mechanism 4 on the inner surface of the existing pipe 200, they serve to prevent contact between outer rollers 43a, 43b and the inner surface of the existing pipe 200 during winding of the rehabilitating pipe 130.

This allows the outer rollers 43a, 43b to be rotated without coming into contact with the existing pipe 200 in the radial direction of the existing pipe 200. Furthermore, the coupling frames 29 provided extending at opposite side portions of the joining mechanism 4 stably support the tracks of the gearbox 40 and the wheels 6 with respect to the existing pipe 200. Thus, the outer rollers 43a, 43b are supported in an arrangement in which they do not come into contact with the existing pipe 200, and therefore the winding operation can proceed very smoothly without producing a frictional force that may affect the driving, regardless of the conditions of the inner surface of the existing pipe 200.

The configuration of the wheels 6 is not limited to that described above, and the wheels 6 may be configured in any manner as long as they are configured as supports for supporting the orbiting tracks of the outer rollers 43a, 43b on the inner surface of the existing pipe 200. For example, the wheels 6 may be rotational bodies whose length increases in the axial direction, rollers that are journaled, or may be provided in a plurality of locations in the orbiting direction of the winding machine 1.

Accordingly, concurrently with winding of the rehabilitating pipe 130 in the winding machine 1, the operation of loading a back-filling material into the space between the rehabilitating pipe 130 and the existing pipe 200 can be performed. As described above, the outer roller 43b present between the existing pipe 200 and the rehabilitating pipe 130 (the plastic strip 100) is rotatable. Accordingly, it is preferable that the back-filling material injection nozzle is arranged facing the outer surface the plastic strip 100 (rehabilitating pipe 130) that has passed through the outer roller 43b. That is, provision of the back-filling material injection nozzle in this manner prevents any back-filling material attached to the outer roller 43b from affecting the operation of the pinch roller 41b, and therefore there is no possibility that the driving of the winding machine 1 is interrupted.

Furthermore, since the winding machine 1 has substantially an annular structure, the winding machine 1 does not clog the existing pipe 200 during winding. Therefore, the rehabilitating pipe 130 can be produced stably in the existing pipe 200 even when water is passed through the existing pipe 200.

With the above-described configuration, the winding machine 1 increases the stiffness of the joining mechanism 4 in an area around the outer rollers 43a, 43b to which an excessive load is applied. Further, it is highly stable due to provision of the wheels 6, and avoids contact of the outer rollers 43a, 43b with projections and depressions, an obstacle, or the like on the inner wall of the existing pipe 200, thus preventing damage. Accordingly, the winding machine 1 can increase the operational efficiency and enables the winding operation to be performed smoothly.

With the winding machine and the winding method as described above, the plastic strip can be supplied to the winding machine, and the rehabilitating pipe can be formed efficiently and smoothly without an operator entering the existing pipe. Further, since the winding machine is configured such that it performs winding smoothly while orbiting on the inner surface of the existing pipe smoothly as described above, it is possible to perform a highly reliably rehabilitating operation by a small number of operators without suspending the winding process for repair or replacement of various parts.

It should be appreciated that the present invention can be reduced to practice in various other forms without departing from its spirit or essential features. For this reason, the above-described exemplary embodiments are to all intents and purposes merely illustrative and should not be construed as limiting. The scope of the present invention is defined by the claims and is not in any way restricted by the descriptions of the specification. Furthermore, all variations and modifications of the claims within the scope of equivalency fall within the scope of the present invention.

This application claims priority rights from Japanese Patent Application No. 2009-174641 filed on Jul. 27, 2009 in Japan, the content of which is hereby incorporated in its entirety by reference herein.

Industrial Applicability

The present invention can be suitably used in methods for rehabilitating a deteriorated existing pipe by lining.

Reference Signs List

1 Winding machine
2 Frame
21 Link
22, 23 Link frame
29 Coupling frame
3 Roller
4 Joining mechanism
40 Gearbox
42, 42a, 42b Inner roller
43, 43a, 43b Outer roller
45 Hydraulic motor
46 Gear mechanism
48 Drive unit
49 Fit unit
5 Chain link
55 Handle
6 Wheel
7 Guide
71, 72 Regulating roller
91 Winding drum
92 Power generator
93 Hydraulic unit
100 Plastic strip
101 Joint convex portion
102 Joint concave portion
103 Rib
108 Inclined piece
109 Reinforcing material
130 Rehabilitating pipe
200 Existing pipe

The invention claimed is:

1. A winding machine for forming a rehabilitating pipe by using a plastic strip, comprising:
   a frame installed inside an existing pipe, a joining mechanism for joining a plastic strip, and at least one wheel for supporting the joining mechanism on an inner surface of the existing pipe,
   wherein the plastic strip is an elongated material that comprises joint portions and that is formed into a tubular shape by the joint portions arranged adjacent to each other by being helically wound and joined by the joining mechanism,
   the frame comprises a plurality of rollers rotating in contact with the plastic strip to he wound, and is capable of orbiting,
   the joining mechanism that is provided in the frame and that comprises an inner roller and an outer roller that sandwich the plastic strip from inside and outside to join the joint the joint portions,
   the at least one wheel, which has a larger diameter than the outer roller, is provided at a side portion of the joining mechanism so as to be rotated in contact with the inner surface of the existing pipe, and comprises a rotational shaft thereof at a position different from positions of rotational shafts of the inner roller and the outer roller, and
   the frame and the joining mechanism orbit inside the inner surface of the existing pipe, and the at least one wheel is rotated in contact with the inner surface of the existing pipe, whereby the outer roller can be maintained separated from the inner surface of the existing pipe.

2. The winding; machine according to claim 1,
   wherein the frame is made up of a plurality of links and can be made to have any outer shape, and
   comprises coupling frames that couple the joining mechanism to the links while maintaining a constant angle.

3. The winding machine according to claim 1,
   wherein the at least one wheel is provided both at front and rear sides in a rotation direction of the outer roller.

4. The winding machine according to claim 1,
   wherein the joining mechanism comprises a drive unit and a fit unit,
   the drive unit and the fit unit each independently comprise an inner roller and an outer roller,
   the drive unit causes the joining mechanism to orbit along the inner surface of the existing pipe, and
   the fit unit joins the joint portions of the plastic strip with each other.

5. The winding machine according to claim 4,
   wherein the drive unit comprises a first portion where the inner roller and the outer roller sandwich a newly supplied plastic strip whose joint portions have not been joined, and a second portion where the inner roller and the outer roller sandwich the plastic strip whose joint portions have been joined, and the joining mechanism is orbited by reactive force by which the second portion sandwiches and sends out the plastic strip.

6. The winding machine according to claim 4,
   wherein the inner roller of the fit unit is rotatably provided on a rotational shaft.

7. The winding machine according to claim 1,
wherein the frame comprises, inside the frame, a guide that defines a path for supplying the plastic strip to the joining mechanism.

8. The winding machine according to claim 7,
wherein the guide includes a plurality of rollers that are provided in pairs so as to make abutment with the inside and the outside of the plastic strip and be rotated.

9. The winding machine according to claim 7,
wherein the guide comprises:
a curved guide plate, and
a plurality of rollers that are rotated in abutment with the plastic strip and hold the plastic strip between the guide plate and themselves.

10. A winding method for forming, by using the winding machine according to claim 1, a rehabilitating pipe from an elongated plastic strip, the method comprising:
installing the winding machine in an existing pipe, and supplying an elongated plastic strip comprising joint portions at opposite side edge portions to the winding, machine in the existing pipe, and
driving the winding machine in a state in which the joining mechanism is supported on an inner surface of the existing pipe by the at least one wheel, and joining the joint portions of the plastic strip in a state in which the outer roller is separated from the inner surface of the existing pipe.

\* \* \* \* \*